US012797737B2

(12) United States Patent
Wang et al.

(10) Patent No.: US 12,797,737 B2
(45) Date of Patent: Nov. 17, 2026

(54) CONTROLLING NON-PLAYER CHARACTERS BASED ON SOUND LEVELS

(71) Applicant: Tencent Technology (Shenzhen) Company Limited, Shenzhen (CN)

(72) Inventors: Yulong Wang, Shenzhen (CN); Yang Yang, Shenzhen (CN); Yachang Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 164 days.

(21) Appl. No.: 18/661,482

(22) Filed: May 10, 2024

(65) Prior Publication Data

US 2024/0293746 A1 Sep. 5, 2024

Related U.S. Application Data

(63) Continuation of application No. PCT/CN2023/117303, filed on Sep. 6, 2023.

(30) Foreign Application Priority Data

Sep. 26, 2022 (CN) ......................... 202211174826.0

(51) Int. Cl.
*A63F 13/56* (2014.01)

(52) U.S. Cl.
CPC .................................... *A63F 13/56* (2014.09)

(58) Field of Classification Search
CPC ........................................................ A63F 13/56
See application file for complete search history.

(56) References Cited

U.S. PATENT DOCUMENTS 11,285,393 B1 * 3/2022 Chemistruck ........... A63F 13/67
2012/0258797 A1 * 10/2012 Cullen .................... A63F 13/54 463/35

(Continued)

FOREIGN PATENT DOCUMENTS

CN 107890672 A 4/2018
CN 113440839 A 9/2021
CN 115103292 A 9/2022

OTHER PUBLICATIONS

International Search Report and Written Opinion received for PCT Patent Application No. PCT/CN2023/117303, mailed on Nov. 10, 2023, 12 pages (5 pages of English Translation and 7 pages of Original Document).

(Continued)

*Primary Examiner* — Jay Trent Liddle
(74) *Attorney, Agent, or Firm* — ARENTFOX SCHIFF LLP

(57) ABSTRACT

A method for controlling an NPC includes obtaining a first sound level and a first propagation distance of a first sound made by a first player character at a first position in a virtual scene. The method further includes, when a distance between an NPC and the first player character is less than the first propagation distance and less than a preset hearing radius of the NPC, determining a sound level of the first sound heard by the NPC in the virtual scene according to the first sound level and the distance between the NPC and the first player character. The method further includes controlling, by a server, the NPC to perform a behavioral operation corresponding to the first sound when the sound level of the first sound heard by the NPC is greater than or equal to a first sound level threshold.

20 Claims, 12 Drawing Sheets

(56) References Cited

U.S. PATENT DOCUMENTS

| | | | | |
|---|---|---|---|---|
| 2018/0314942 | A1* | 11/2018 | Shinn | G06N 3/08 |
| 2019/0272707 | A1* | 9/2019 | Washington | A63F 13/837 |
| 2022/0379217 | A1* | 12/2022 | Kerber | G06N 3/006 |

OTHER PUBLICATIONS

Office Action received for Chinese Patent Application No. 202211174826.0, mailed on Mar. 6, 2026, 21 pages (11 pages of English Translation and 10 pages of Original Document).

* cited by examiner

S202: Obtain a first sound intensity of a first sound and a first propagation distance of the first sound, the first sound being a sound made by a first player character at a first position, and the first sound intensity being a preset sound intensity corresponding to a type of a virtual terrain of the first position and a first movement state of the first player character at the first position

↓

S204: Determine, when a first target distance between a non-player character (NPC) and the first player character is less than the first propagation distance and less than a preset hearing radius of the NPC, a sound intensity of the first sound heard by the NPC according to the first sound intensity and the first target distance

↓

S206: Control the NPC to perform a behavioral operation corresponding to the first sound when the sound intensity of the first sound heard by the NPC is greater than or equal to a first sound intensity threshold

FIG. 2

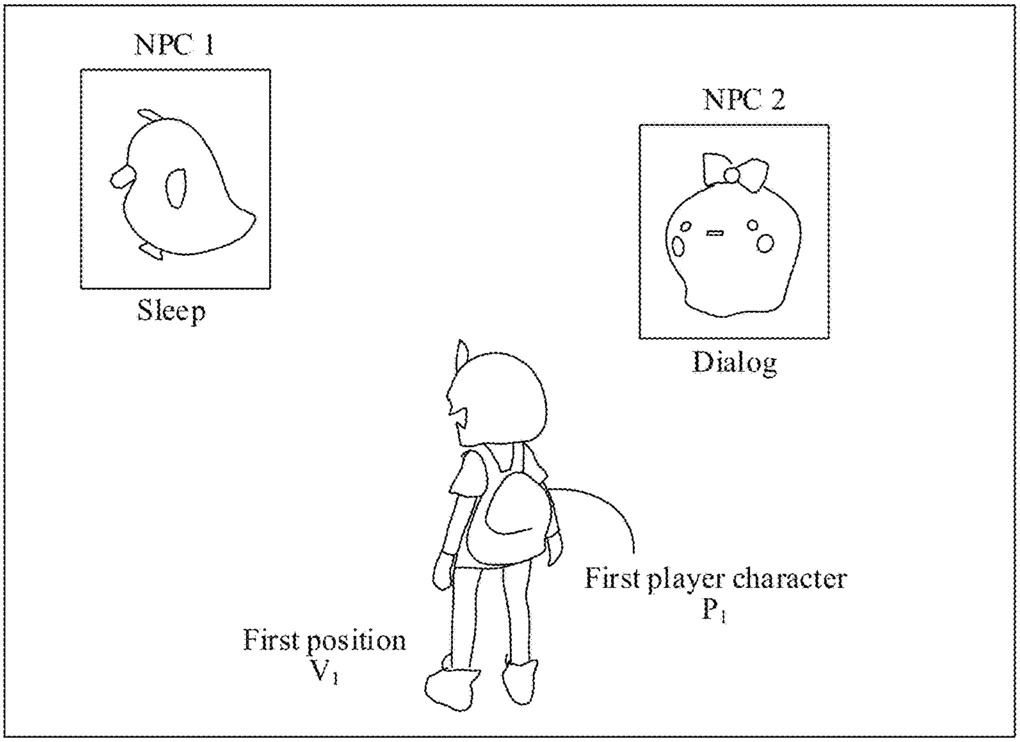

FIG. 3

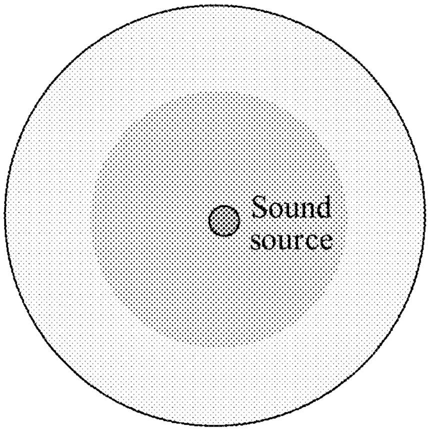
(a)
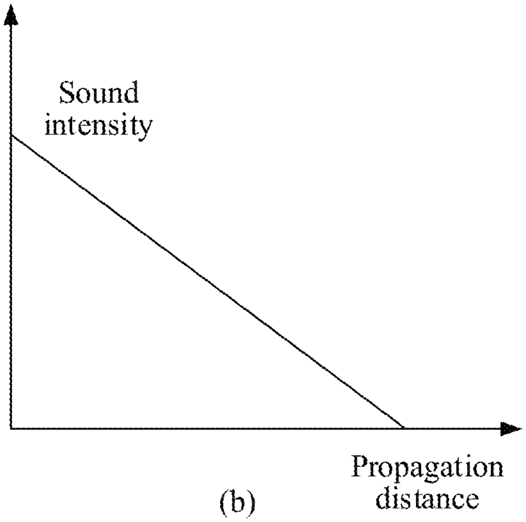
(b)
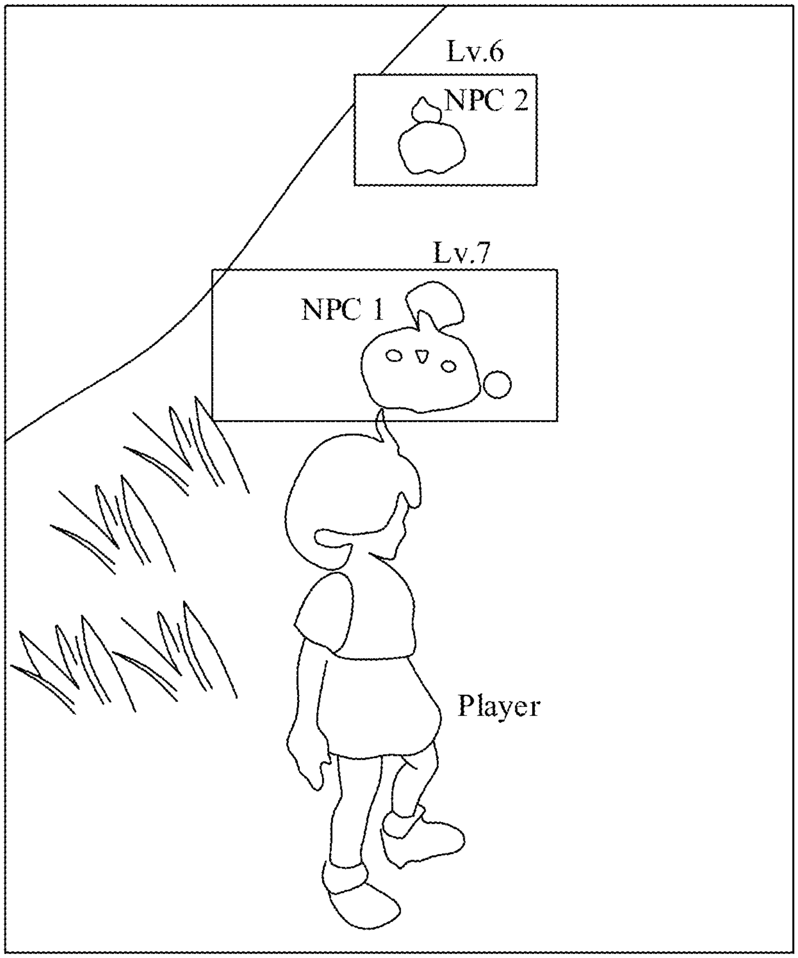
(c)
FIG. 8

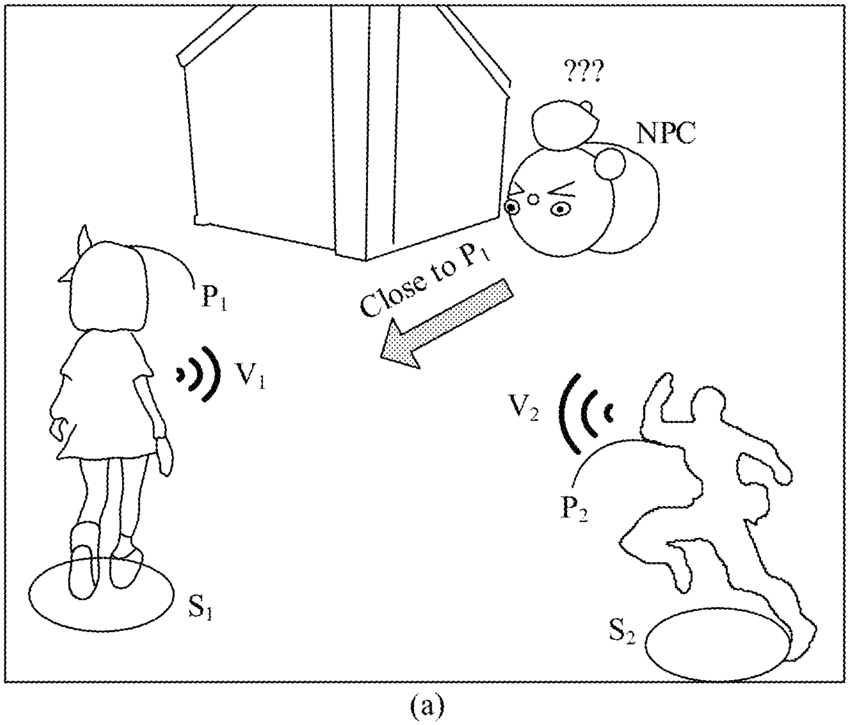
(a)
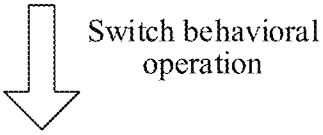
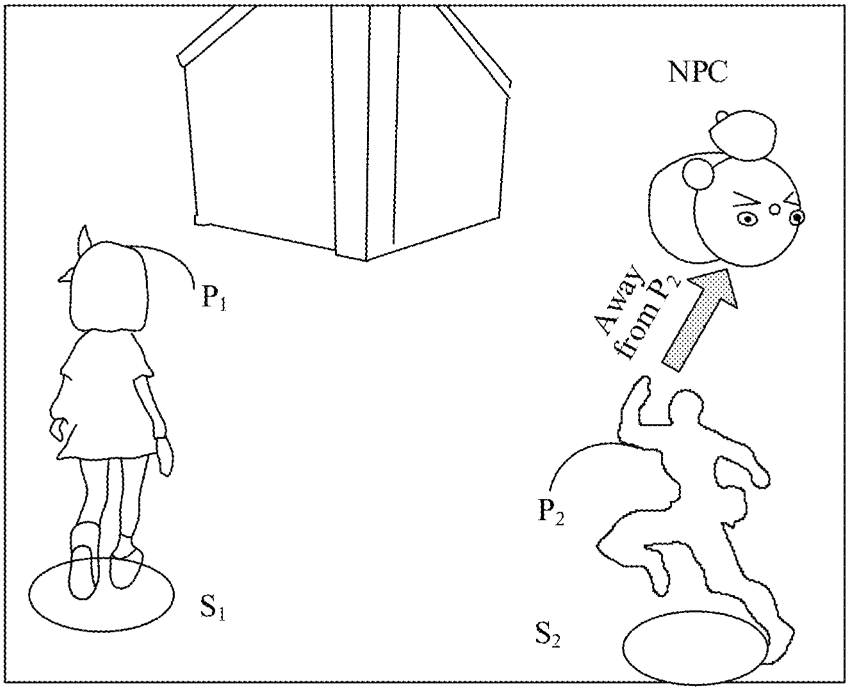
(b)
FIG. 14

CONTROLLING NON-PLAYER CHARACTERS BASED ON SOUND LEVELS

RELATED APPLICATIONS

This application is a continuation of International Application No. PCT/CN2023/117303, filed on Sep. 6, 2023, which claims priority to Chinese Patent Application No. 202211174826.0, entitled "METHOD AND APPARATUS FOR CONTROLLING NON-PLAYER CHARACTER, STORAGE MEDIUM, AND ELECTRONIC DEVICE" and filed on Sep. 26, 2022. The disclosures of the prior applications are hereby incorporated by reference in their entirety.

FIELD OF THE TECHNOLOGY

The present disclosure relates to the field of computer technologies, including a method and an apparatus for controlling a non-player character, a storage medium, and an electronic device.

BACKGROUND OF THE DISCLOSURE

In a virtual game scene, a plurality of different types of non-player characters (NPCs) are usually set. In addition, in order to make a game more interesting, an NPC performs a specified behavioral operation through an environmental perception capability of the NPC, thereby realizing an interaction between the NPC and a player.

In the related art, the environmental perception capability of the NPC mainly relies on visual perception, and usually the visual perception capability of the NPC is simulated based on information such as a distance and an angle between the NPC and the player. For example, in a 3D game scene, when the player is at a specified distance in front of the NPC and within a specified angle range, the NPC may see the player and interact with the player.

However, the impact of the 3D game scene on the vision of the NPC is not considered in the related art. For example, when the player hides behind an obstacle such as a rock, the NPC cannot see the player. Therefore, when the player walks, runs, or sprints in a blind spot of vision of the NPC, the NPC cannot perceive the player, and it is even impossible to control the NPC to interact with the player, resulting in a technical problem of being unable to accurately control the non-player character to perform the behavioral operation.

In view of the foregoing problem, no effective solution has been provided yet.

SUMMARY

Aspects of the present disclosure provide a method and an apparatus for controlling a non-player character, a storage medium, and an electronic device, to at least solve the technical problem of being unable to accurately control a non-player character to perform a behavioral operation.

In an aspect, a method for controlling a non-player character includes obtaining a first sound level of a first sound and a first propagation distance of the first sound, the first sound being a sound made by a first player character at a first position in a virtual scene. The first sound level corresponds to a first movement of the first player character at the first position, and the first propagation distance is a propagation distance determined according to the first sound level. The method further includes, when a distance between an NPC and the first player character is less than the first propagation distance and less than a preset hearing radius of the NPC, determining a sound level of the first sound heard by the NPC in the virtual scene according to the first sound level and the distance between the NPC and the first player character. The method further includes controlling, by a server, the NPC to perform a behavioral operation corresponding to the first sound when the sound level of the first sound heard by the NPC is greater than or equal to a first sound level threshold.

In an aspect, an apparatus for controlling a non-player character includes processing circuitry of a server configured to obtain a first sound level of a first sound and a first propagation distance of the first sound, the first sound being a sound made by a first player character at a first position in a virtual scene. The first sound level corresponds to a first movement of the first player character at the first position, and the first propagation distance is a propagation distance determined according to the first sound level. The processing circuitry is further configured to, when a distance between an NPC and the first player character is less than the first propagation distance and less than a preset hearing radius of the NPC, determine a sound level of the first sound heard by the NPC in the virtual scene according to the first sound level and the distance between the NPC and the first player character. The processing circuitry is further configured to control, by a server, the NPC to perform a behavioral operation corresponding to the first sound when the sound level of the first sound heard by the NPC is greater than or equal to a first sound level threshold.

In an aspect, a non-transitory computer-readable storage medium stores computer-readable instructions, which, when executed by processing circuitry of a server, cause the server to perform a method of controlling a non-player character. The method includes obtaining a first sound level of a first sound and a first propagation distance of the first sound, the first sound being a sound made by a first player character at a first position in a virtual scene. The first sound level corresponds to a first movement of the first player character at the first position, and the first propagation distance is a propagation distance determined according to the first sound level. The method further includes, when a distance between an NPC and the first player character is less than the first propagation distance and less than a preset hearing radius of the NPC, determining a sound level of the first sound heard by the NPC in the virtual scene according to the first sound level and the distance between the NPC and the first player character. The method further includes controlling, by a server, the NPC to perform a behavioral operation corresponding to the first sound when the sound level of the first sound heard by the NPC is greater than or equal to a first sound level threshold. In the aspects provided in this disclosure, when it is determined that the NPC can hear the first sound made by the first player character according to the first target distance between the non-player character (NPC) and the first player character and the preset hearing radius of the NPC, the NPC is controlled to perform the behavioral operation corresponding to the first sound by comparing the sound intensity of the first sound heard by the NPC with the first sound intensity threshold. In other words, by comparing the sound intensity of the first sound heard by the NPC and the first sound intensity threshold, the NPC can accurately perform the corresponding behavioral operation, which avoids the technical problem of being unable to accurately control the NPC to perform the behavioral operation, and improves the accuracy of controlling the NPC to perform the behavioral operation.

BRIEF DESCRIPTION OF THE DRAWINGS

The appended drawings illustrated herein are intended to provide further understanding of the present invention and form part of this disclosure, and schematic aspects of the present disclosure and their descriptions are intended to explain the present disclosure and do not constitute undue qualification of the present disclosure. In the accompanying drawings:

FIG. 2 is an flowchart of a method for controlling a non-player character according to an aspect of the present disclosure.

FIG. 3 is an schematic diagram (1) of controlling an NPC to perform a behavioral operation corresponding to a first sound according to an aspect of the present disclosure.

FIG. 8 is an schematic diagram of an attenuation process of a sound intensity of a first sound according to an aspect of the present disclosure.

FIG. 14 is an schematic diagram of switching a behavioral operation corresponding to a first sound performed by an NPC to a behavioral operation corresponding to a second sound according to an aspect of the present disclosure.

DETAILED DESCRIPTION

To make a person skilled in the art better understand solutions of the present disclosure, the technical solutions in embodiments of the present disclosure are described below with reference to the accompanying drawings in the aspects of the present disclosure. The described aspects are merely some rather than all of the aspects of the present disclosure. All other aspects obtained by a person of ordinary skill in the art based on the aspects of the present disclosure shall fall within the protection scope of the present disclosure.

First, terms used or related in the aspects of the present disclosure are described as follows. It can be understood that the following description is an explanation of the terms but not the only explanation:

AI: A name for an NPC with an anthropomorphic behavior in a game.

Hearing range: A range in which an AI object can hear a sound, generally a spherical region.

Hearing awareness threshold: A sound intensity value that causes an AI object to be aware. When hearing a sound greater than this value, the AI object enters an awareness state. The term "sound intensity" as used in the present disclosure is defined as a sound level or loudness level, for example measured in dB or other dimensions that capture sound levels.

Hearing discovery threshold: A sound intensity value that causes an AI object to discover a player. When hearing a sound greater than this value, the AI object discovers the player and interacts with the player.

In the specification, claims, and accompanying drawings of the present disclosure, the terms "first", "second", and so on are intended to distinguish between similar objects but do not necessarily indicate a specific order or sequence. It should be understood that the data so used may be interchanged in an appropriate condition, so that the aspects of the present disclosure described herein can be implemented in an order other than those illustrated or described herein. Moreover, the terms "include", "contain", and any other variants thereof mean to cover the non-exclusive inclusion. For example, a process, method, system, product, or device that includes a list of operations or units is not necessarily limited to those operations or units that are clearly listed, but may include other operations or units not expressly listed or inherent to such a process, method, system, product, or device.

Figure 1:
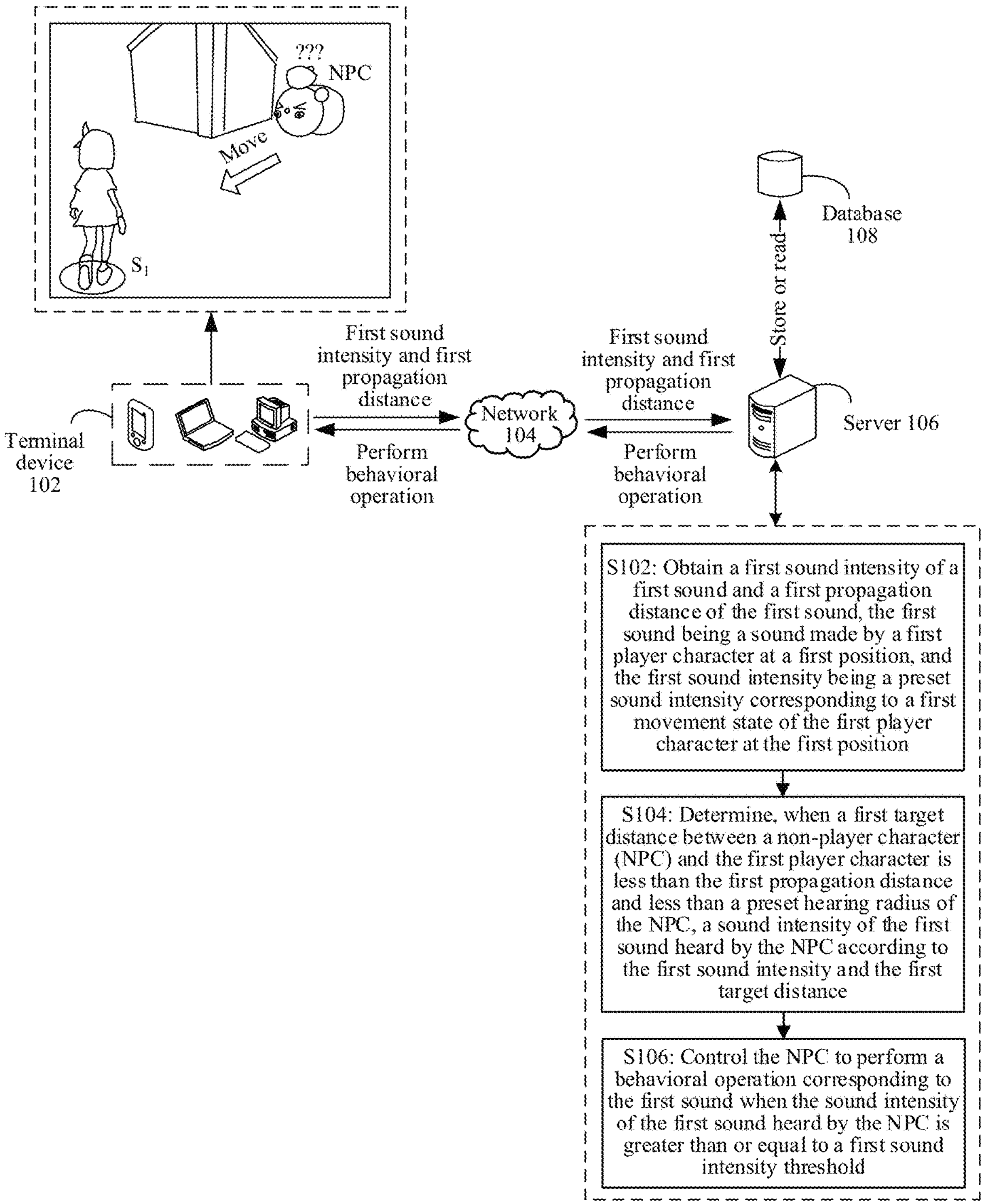
FIG. 1 is an schematic diagram of an application scenario of a method for controlling a non-player character according to an aspect of the present disclosure.

According to an aspect of the aspects of the present disclosure, a method for controlling a non-player character is provided. As an implementation, the method for controlling a non-player character may be, but is not limited to, applied to an application scenario shown in FIG. 1. In the application scenario shown in FIG. 1, a terminal device 102 may, but is not limited to, communicate with a server 106 via a network 104, and the server 106 may, but is not limited to, perform an operation on a database 108, such as a data write operation or a data read operation. The terminal device 102 includes, but is not limited to, a human-computer interaction screen, a processor, and a memory. The human-computer interaction screen may be, but is not limited to, configured to display a movement state of a first player character at a first position on the terminal device 102, an interactive behavior between an NPC and the first player character, and the like. The processor may be, but is not limited to, configured to perform a corresponding operation in response to the human-computer interaction operation, or generate a corresponding instruction, and transmit the generated instruction to the server 106. The memory is configured to store related processing data, such as a first sound intensity of a first sound, a first propagation distance of the first sound, and a preset hearing radius of the NPC.

As an implementation, the following operations in the method for controlling a non-player character may be performed on the server 106: S102: Obtain a first sound intensity of a first sound and a first propagation distance of the first sound, the first sound being a sound made by a first player character at a first position, the first sound intensity being a preset sound intensity corresponding to a first movement state of the first player character at the first position, and the first propagation distance being a propagation distance determined according to the first sound intensity; and control the NPC to perform a behavioral operation corresponding to the first sound when a sound intensity of the first sound heard by the NPC is greater than or equal to a first sound intensity threshold. For example, a first sound level of a first sound and a first propagation distance of the first sound are obtained. The first sound is a sound made by a first player character at a first position in a virtual scene, the first sound level corresponding to a first movement of the first player character at the first position. The first propagation distance is a propagation distance determined according to the first sound level. S104: Determine, when a first target distance between a non-player character (NPC) and the first player character is less than the first propagation distance and less than a preset hearing radius of the NPC, a sound intensity of the first sound heard by the NPC according to the first sound intensity and the first target distance. For example, when a distance between a non-player character (NPC) and the first player character is less than the first propagation distance and less than a preset hearing radius of the NPC, a sound level of the first sound heard by the NPC in the virtual scene is determined according to the first sound level and the distance between the NPC and the first player character. S106: Control the NPC to perform a behavioral operation corresponding to the first sound when the sound intensity of the first sound heard by the NPC is greater than or equal to a first sound intensity threshold. For example, the NPC is controlled by a server to perform a behavioral operation corresponding to the first sound when the sound level of the first sound heard by the NPC is greater than or equal to a first sound level threshold.

By using the foregoing method, when it is determined that the NPC can hear the first sound made by the first player character according to the first target distance between the non-player character (NPC) and the first player character and the preset hearing radius of the NPC, the NPC is controlled to perform the behavioral operation corresponding to the first sound by comparing the sound intensity of the first sound heard by the NPC with the first sound intensity threshold. In other words, by comparing the sound intensity of the first sound heard by the NPC and the first sound intensity threshold, the NPC can accurately perform the corresponding behavioral operation, which avoids the technical problem of being unable to accurately control the NPC to perform the behavioral operation, and improves the accuracy of controlling the NPC to perform the behavioral operation.

In order to resolve the foregoing technical problem of being unable to accurately control the NPC to perform the behavioral operation, an aspect of the present disclosure provides a method for controlling a non-player character. FIG. 2 is a flowchart of a method for controlling a non-player character according to an aspect of the present disclosure. The process includes the following operations:

S202: Obtain a first sound intensity of a first sound and a first propagation distance of the first sound, the first sound being a sound made by a first player character at a first position, the first sound intensity being a preset sound intensity corresponding to a first movement state of the first player character at the first position, and the first propagation distance being a propagation distance determined according to the first sound intensity.

For example, the first sound intensity and the first propagation distance of the first sound may be obtained from specified parameter values, which are not limited in this disclosure. For example, the first sound intensity may be obtained from the specified parameter values according to the first position of the first player character and the first movement state at the first position, or further in combination with other information. Further, the first propagation distance may be determined according to the first sound intensity. The first propagation distance may be a virtual distance in a virtual scene.

As shown in FIG. 3, assuming that the first player character makes the first sound at the first position, the first sound intensity of the first sound may be determined according to the first movement state of the first player character at the first position.

Figure 4:
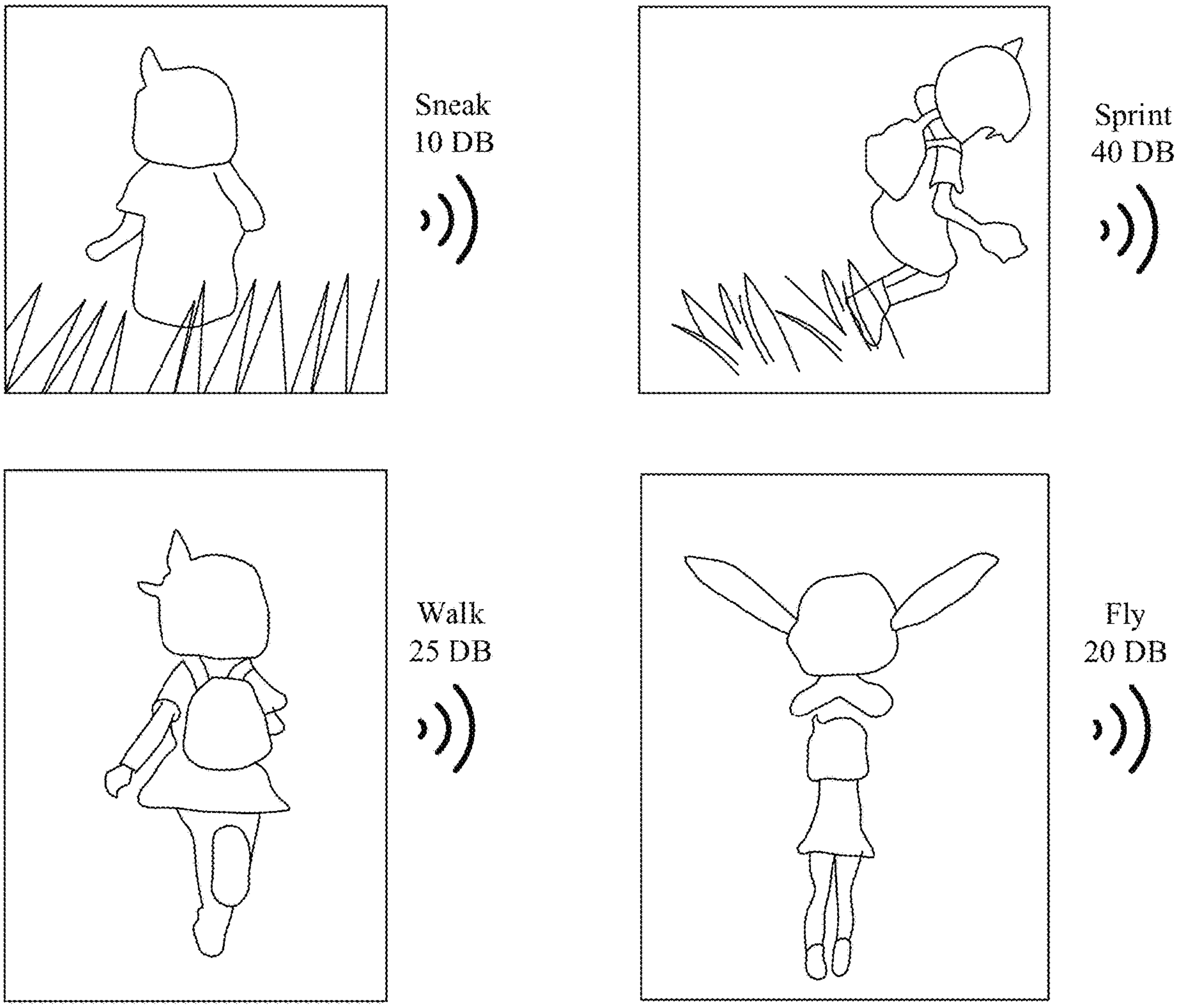
FIG. 4 is an schematic diagram of a sound intensity of a first sound made by a first player character in different types of virtual terrains and different movement states according to an aspect of the present disclosure.

As an example, as shown in FIG. 4, when a movement state of the first player character at the first position is “walking”, an intensity of a sound made by the first player character in the game scene is simulated to be 25 dB according to the movement state of the first player character; when the movement state of the first player character at the first position is “sneaking”, the intensity of the sound made by the first player character in the game scene is simulated to be 10 dB according to the movement state of the first player character; when the movement state of the first player character at the first position is “sprinting”, the intensity of the sound made by the first player character in the game scene is simulated to be 40 dB according to the movement state of the first player character; and when the movement state of the first player character at the first position is “flying”, the intensity of the sound made by the first player character in the game scene is simulated to be 20 dB according to the movement state of the first player character.

As another example, in addition to being related to the first movement state of the first player character at the first position, the first sound intensity may also be a preset sound intensity corresponding to a type of a virtual terrain of the first position and the first movement state of the first player character at the first position. For the sound made by a player in the game scene, the sound intensities of different sounds made by the player in the game scene may be simulated based on, but not limited to, a behavioral state of the player. For example, as shown in FIG. 4, when a first player is located on different types of virtual terrains and in different movement states, the intensities of the sounds made are different.

For example, when the first player character is sneaking in a grass, according to the virtual terrain “grass” of the first position of the first player character and the movement state “sneaking”, the intensity of the sound made by the first player character in the game scene may be simulated to be 10 dB; and according to the virtual terrain “ground” of the first position of the first player character and the movement state “sneaking”, the intensity of the sound made by the first player character in the game scene may be simulated to be 15 dB.

(2) When the first player character is sprinting forward in the grass, according to the virtual terrain “grass” of the first position of the first player character and the movement state “sprinting forward”, the intensity of the sound made by the first player character in the game scene may be simulated to be 40 dB; and according to the virtual terrain "mountain" of the first position of the first player character and the movement state "sprinting forward", the intensity of the sound made by the first player character in the game scene may be simulated to be 50 dB.

(3) When the first player character is walking normally on the ground, according to the virtual terrain "ground" of the first position of the first player character and the movement state "walking", the intensity of the sound made by the first player character in the game scene may be simulated to be 25 dB; and according to the virtual terrain "grass" of the first position of the first player character and the movement state "walking", the intensity of the sound made by the first player character in the game scene may be simulated to be 30 dB.

(4) When the first player character is flying in the sky, according to the virtual terrain "sky" of the first position of the first player character and the movement state "flying", the intensity of the sound made by the first player character in the game scene may be simulated to be 20 dB.

Based on the foregoing analysis, the method of determining the first sound intensity of the first sound may be, but is not limited to, querying a pre-created relationship mapping table according to the type of the virtual terrain of the first position and/or the first movement state, to obtain a numerical value of the first sound intensity.

S204: Determine, when a first target distance between a non-player character (NPC) and the first player character is less than the first propagation distance and less than a preset hearing radius of the NPC, a sound intensity of the first sound heard by the NPC according to the first sound intensity and the first target distance.

Different types of NPCs correspond to different hearing capabilities. Therefore, in the process of determining the sound intensity of the first sound heard by the NPC, in addition to considering the first target distance between the NPC and the first player character, a hearing perception capability of the NPC, for example, the preset hearing radius of the NPC also needs to be considered.

Figure 5:
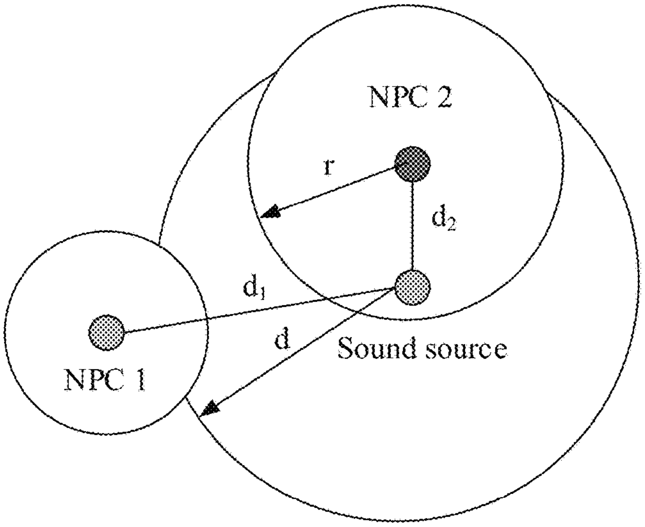
FIG. 5 is an schematic diagram of a preset hearing radius of an NPC according to an aspect of the present disclosure.

For example, as shown in FIG. 5, it is assumed that a propagation distance of the first sound made by the first player character (which may also be understood as the first propagation distance of the first sound) is d, and a target distance between the first player character and an NPC 1 is d1. Since d1>d, the NPC 1 is far away from the first player character, and the NPC 1 cannot hear the first sound. A target distance between the first player character and an NPC 2 is d2. Since d2<d and d2<r, it is determined that the NPC 2 may hear the first sound with a stronger sound intensity, where r is a preset hearing radius of the NPC 2, and r determines a hearing range of the NPC 2. Further, the sound intensity of the first sound heard by the NPC 2 is determined according to the first sound intensity of the first sound and the first target distance.

In addition, whether the NPC 1 and the NPC 2 can hear the first sound may further be determined through the following implementation process: When the first player character makes the first sound, NPCs within the propagation distance d may first be determined according to the propagation distance d of the first sound, as shown in FIG. 5, including the NPC 1 and the NPC 2; and then, according to whether a sound source of the first sound is within the preset hearing radius of the NPC, it may be determined that only the NPC 2 can hear the first sound. Although the NPC 1 is within the propagation distance d of the first sound, the sound source of the first sound is outside the preset hearing radius of the NPC 1, and therefore the NPC 1 cannot hear the first sound.

The propagation distance d of the first sound, the preset hearing radius r of the NPC 2, the target distance between the NPC 1 and the first player character, the target distance between the NPC 2 and the first player character, and the like are only examples but are not limited thereto.

S206: Control the NPC to perform a behavioral operation corresponding to the first sound when the sound intensity of the first sound heard by the NPC is greater than or equal to a first sound intensity threshold.

By performing the operation S204, when the sound intensity of the first sound heard by the NPC is determined, the sound intensity of the first sound heard by the NPC is compared with the first sound intensity threshold, for example, the sound intensity of the first sound heard by the NPC is compared with a hearing awareness threshold of the NPC.

Obviously, only when the NPC is aware of the first sound, the behavioral operation corresponding to the first sound may be performed. For example, when the NPC 2 shown in FIG. 5 can hear the first sound, and the sound intensity of the first sound heard by the NPC 2 is greater than the hearing awareness threshold (the first sound intensity threshold), a dialog operation shown in FIG. 3 is performed. Since the NPC 1 cannot hear the first sound, the NPC 1 continues to be in a daily state, such as sleeping or patrolling.

The foregoing operations S202 to S206 are all performed on a server side, which improves data synchronization efficiency and data processing efficiency between different clients, and avoids problems such as client cheating and large data synchronization delay.

In the aspects provided in this disclosure, when it is determined that the NPC can hear the first sound made by the first player character according to the first target distance between the non-player character (NPC) and the first player character and the preset hearing radius of the NPC, the NPC is controlled to perform the behavioral operation corresponding to the first sound by comparing the sound intensity of the first sound heard by the NPC with the first sound intensity threshold. In other words, by comparing the sound intensity of the first sound heard by the NPC and the first sound intensity threshold, the NPC can accurately perform the corresponding behavioral operation, which avoids the technical problem of being unable to accurately control the NPC to perform the behavioral operation, and improves the accuracy of controlling the NPC to perform the behavioral operation.

In order to ensure the authenticity of the hearing perception of the NPC and provide the NPC with an anthropomorphic hearing perception capability, in this aspect of this disclosure, various rules are set according to different parameters, for example, the preset hearing radius of the NPC and the first sound intensity threshold, to control the NPC to perform the behavioral operation corresponding to the first sound. In addition, this aspect of this disclosure further provides a second sound intensity threshold.

As an example, the controlling the NPC to perform a behavioral operation corresponding to the first sound when the sound intensity of the first sound heard by the NPC is greater than or equal to a first sound intensity threshold includes:

controlling the NPC to perform a first behavioral operation when the sound intensity of the first sound heard by the NPC is greater than or equal to the first sound intensity threshold and less than a second sound intensity threshold, where the first behavioral operation is a behavioral operation performed when the NPC is aware of a sound.

In this aspect of this disclosure, when the NPC can hear the first sound, in order to accurately control the NPC to perform the behavioral operation corresponding to the first sound, the behavioral operation performed is classified according to a case in which the NPC is aware of the first sound but does not discover the first player character, and a case in which the NPC is aware of the first sound and discovers the first player character. The first behavioral operation performed in the case in which the NPC is aware of the first sound but does not discover the first player character is first described in detail below with specific examples.

As an example, in the case in which the NPC is aware of the first sound but does not discover the first player character, the controlling the NPC to perform a behavioral operation corresponding to the first sound includes:

controlling the NPC to move to the first position when the sound intensity of the first sound heard by the NPC is greater than or equal to the first sound intensity threshold and less than the second sound intensity threshold; or controlling the NPC to search for the first player character while moving to the first position when the sound intensity of the first sound heard by the NPC is greater than or equal to the first sound intensity threshold and less than the second sound intensity threshold.

Figure 6:
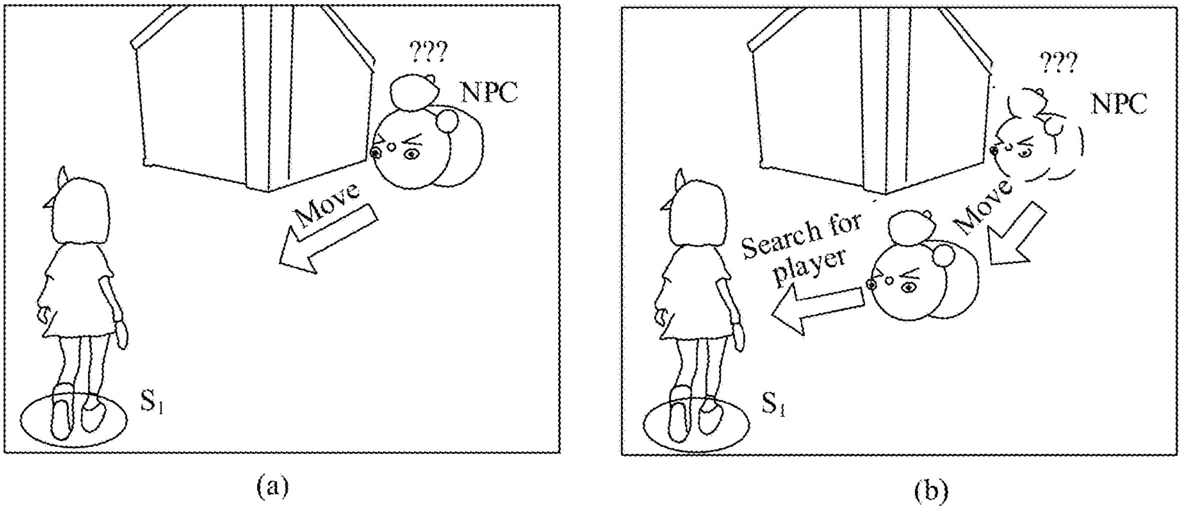
FIG. 6 is an schematic diagram (2) of controlling an NPC to perform a behavioral operation corresponding to a first sound according to an aspect of the present disclosure.

For example, as shown in (a) of FIG. 6, when the sound intensity of the first sound heard by the NPC is greater than or equal to the first sound intensity threshold and less than the second sound intensity threshold, the NPC is aware of the first sound and alarmed by the first sound, and performs an awareness behavior, for example, moving in a direction of a first position S1 of the first player character.

Obviously, since the sound intensity of the first sound heard by the NPC is less than the second sound intensity threshold, it means that the NPC only hears the first sound, but does not discover the first player character. Therefore, in addition to only moving in the direction of the first position S1, the first behavioral operation performed by the NPC may also be searching for the first player character while moving.

Specifically, as shown in (b) of FIG. 6, when the sound intensity of the first sound heard by the NPC is greater than or equal to the first sound intensity threshold and less than the second sound intensity threshold, the NPC moves in the direction of the first position S1 of the first player character and searches for the first player character during the movement.

As another example, in the case in which the NPC is aware of the first sound and discovers the first player character, the controlling the NPC to perform a behavioral operation corresponding to the first sound further includes:

controlling the NPC to perform a second behavioral operation when the sound intensity of the first sound heard by the NPC is greater than or equal to the second sound intensity threshold, where the second behavioral operation is a behavioral operation performed when the NPC discovers the first player character.

The second sound intensity threshold may be, but is not limited to, the hearing discovery threshold for the NPC to discover the first player character. That is, when the sound intensity of the first sound heard by the NPC is greater than or equal to the second sound intensity threshold, the NPC discovers the first player character and performs the second behavioral operation corresponding to the first sound, specifically including:

controlling the NPC to move in a direction away from the first player character or controlling the NPC to move in a direction of the first player character when the sound intensity of the first sound heard by the NPC is greater than or equal to the second sound intensity threshold; or controlling the NPC to perform an interactive operation with the first player character when the sound intensity of the first sound heard by the NPC is greater than or equal to the second sound intensity threshold.

Figure 7:
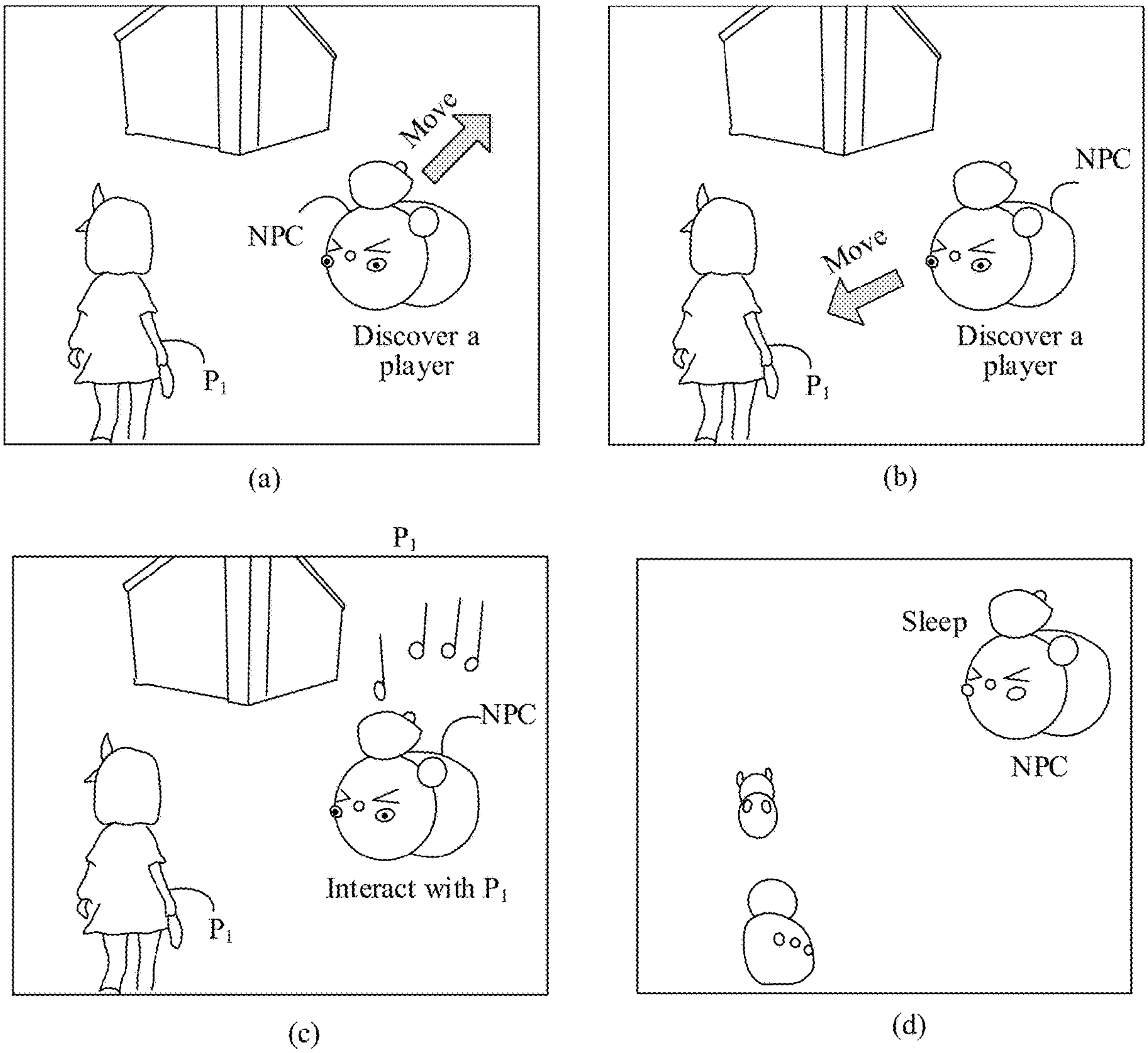
FIG. 7 is an schematic diagram (3) of controlling an NPC to perform a behavioral operation corresponding to a first sound according to an aspect of the present disclosure.

Since when the sound intensity of the first sound heard by the NPC is greater than or equal to the second sound intensity threshold, the NPC may directly discover the first player character and trigger the corresponding discovery behavior of the NPC (which may also be understood as the second behavioral operation). For example, according to a relationship between the NPC and the first player character, the NPC is controlled to move away from or close to the first player character, or the NPC is controlled to perform an interactive operation with the first player character, and the like. The discovery behavior is described below with specific examples:

(1) As shown in (a) of FIG. 7, when the NPC discovers the first player character, assuming that the NPC and the first player character are in different camps, or the NPC may cause harm to the first player character, the NPC is controlled to move away from the first player character.

(2) As shown in (b) of FIG. 7, when the NPC discovers the first player character, assuming that the NPC and the first player character are in the same camp, or the NPC may not cause harm to the first player character, the NPC is controlled to move close to the first player character.

(3) As shown in (c) of FIG. 7, when the NPC discovers the first player character, the NPC is controlled to perform an interactive operation with the first player character, for example, perform a dialog, or transmit a prompt message to the first player character, to inform the first player character of a position, a status, or the like of the NPC.

Through the foregoing rules, in addition to the first behavioral operation and the second behavioral operation, the controlling the NPC to perform a behavioral operation corresponding to the first sound further includes: when the sound intensity of the first sound heard by the NPC is less than the first sound intensity threshold and less than the second sound intensity threshold, since the NPC does not discover the first sound, the NPC continues to perform the daily behavior. For example, the NPC continues to patrol, rest, or sleep. For details, refer to the schematic diagram shown in (d) of FIG. 7.

Based on the analysis of the foregoing aspects, the NPC is controlled to perform the first behavioral operation corresponding to the first sound, the second behavior operation, or the daily behavioral operation according to a plurality of parameters such as the sound intensity of the first sound heard by the NPC, the first sound intensity threshold, and the second sound intensity threshold, which avoids the problem in the related art that when the NPC is in the blind spot of vision, the visual perception capability of the NPC cannot be used to hear the sound anthropomorphically, and improves the gaming experience of the player.

As an example, the determining a sound intensity of the first sound heard by the NPC according to the first sound intensity and the first target distance includes:

determining a residual sound intensity when the first sound propagates to a position of the NPC according to the first sound intensity and the first target distance;

obtaining a sound intensity of an environmental noise at the position of the NPC; and determining the sound intensity of the first sound heard by the NPC according to the residual sound intensity and the sound intensity of the environmental noise.

To ensure the authenticity of the sound source simulation, it is necessary to fully consider that when the sound propagates in a medium, the intensity of the sound continuously attenuates as the distance increases, and the attenuation of the sound is related to factors such as an attenuation formula, a distance, and a medium feature. For example, as shown in (a) of FIG. 8, the sound intensity of the first sound made from the sound source gradually attenuates to 0 as the propagation distance increases.

For example, assuming that in this aspect of this disclosure, the specific process of sound attenuation is simulated according to a linear attenuation formula, for example, y=a/x, where y is the residual sound intensity of the first sound received by the NPC, x is the first target distance between the first player character and the NPC, and a is the first sound intensity of the first sound made by the first player character at the first position. According to the formula, as the first target distance between the first player character and the NPC gradually increases, the residual sound intensity of the first sound received by the NPC gradually decreases. For details, refer to the schematic diagram shown in (b) in FIG. 8.

For example, if as shown in (c) in FIG. 8, according to the linear attenuation formula, when the first sound is made while the player character is moving, the residual sound intensity of the first sound received by the NPC 1 (whose character level is Lv. 7) who is close to the player character is greater than the residual sound intensity of the first sound received by the NPC 2 (whose character level is Lv. 6) who is far away from the player character. For example, the NPC 1 can hear the first sound made by the player character and move forward to interact with the player character; and the NPC 2 is still in a daily state, for example, performing a daily behavior such as resting or sleeping.

By using the linear attenuation formula, full consideration is given to the process of the sound intensity changing with the propagation distance during sound propagation, and generation and propagation of the sound in the 3D virtual game scene are more realistically restored.

Obviously, the linear attenuation formula is only an example but is not limited thereto. For example, other nonlinear attenuation formulas may alternatively be used.

When the sound intensity of the first sound heard by the NPC is determined, in addition to considering the attenuation process of the first sound, the impact of the sound intensity of the environmental noise on the hearing perception capability of the NPC also needs to be considered, and when the sound intensity of the environmental noise at the position of the NPC is determined, the sound intensity of the first sound heard by the NPC is determined according to the residual sound intensity of the first sound received at the position of the NPC and the sound intensity of the environmental noise.

As an implementation, the determining the sound intensity of the first sound heard by the NPC according to the residual sound intensity and the sound intensity of the environmental noise includes:

determining the sound intensity of the first sound heard by the NPC to be equal to a difference between the residual sound intensity and the sound intensity of the environmental noise when the residual sound intensity is greater than the sound intensity of the environmental noise; and/or determining the sound intensity of the first sound heard by the NPC to be equal to the sound intensity of the environmental noise or to 0 when the residual sound intensity is less than or equal to the sound intensity of the environmental noise.

Since the first sound made by the player character is a sound that the NPC intends to receive, and the environmental noise made by the surrounding environment is a sound that interferes with the NPC hearing the first sound made by the player character, when the residual sound intensity is greater than the sound intensity of the environmental noise, a difference between the residual sound intensity and the sound intensity of the environmental noise is determined as the sound intensity of the first sound heard by the NPC.

Figure 9:
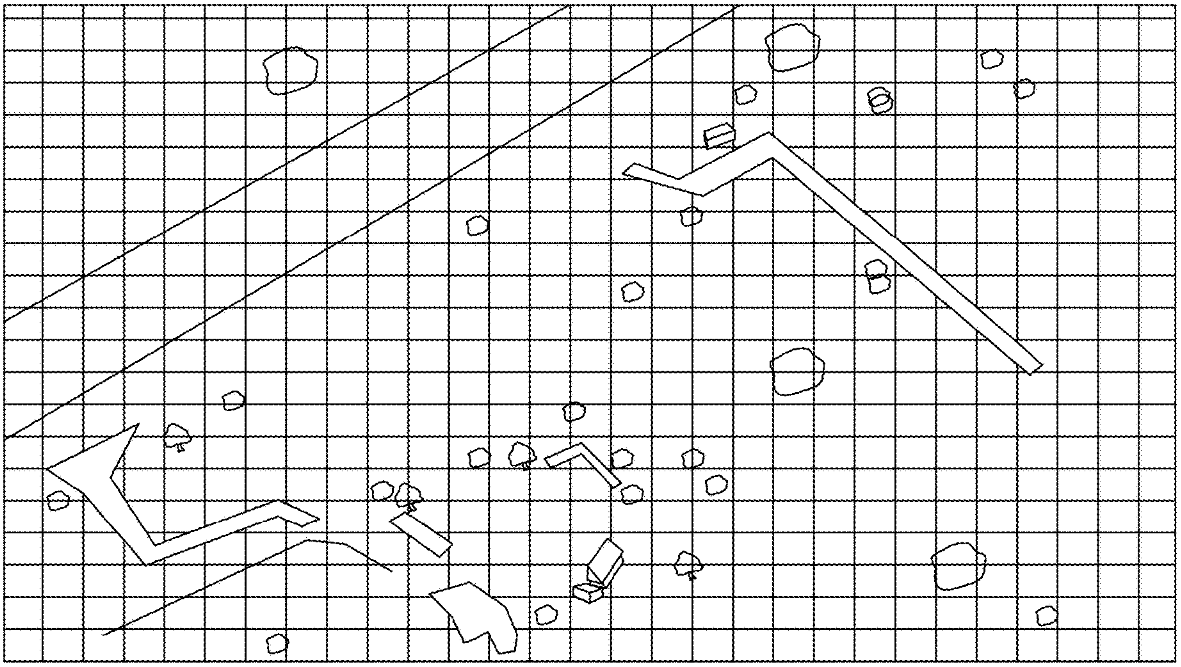
FIG. 9 is an schematic diagram of a set of grids obtained after a target game scene is divided into grids according to an aspect of the present disclosure.

When the first player character makes the first sound and the NPC receives the first sound, according to XYZ coordinates of the position of the NPC, the position of the NPC may be quickly located corresponding to a target grid shown in FIG. 9, and then by querying the sound intensity of the environmental noise corresponding to each grid, the sound intensity of the environmental noise in the target grid may be easily obtained, which improves the efficiency of obtaining the sound intensity of the environmental noise at the position of the NPC.

When the residual sound intensity is less than the sound intensity of the environmental noise at the position of the NPC, since the first sound received by the NPC is masked by the environmental noise at the position of the NPC, the sound intensity of the first sound heard by the NPC is equal to the sound intensity of the environmental noise at the position of the NPC.

When the residual sound intensity is equal to the sound intensity of the environmental noise at the position of the NPC, according to the foregoing calculation method of the difference between the residual sound intensity and the sound intensity of the environmental noise, the sound intensity of the first sound heard by the NPC is 0, that is, the NPC does not actually hear the sound.

Using the foregoing method, according to the residual sound intensity when the first sound propagates to the position of the NPC and the sound intensity of the environmental noise at the position of the NPC, the sound intensity of the first sound heard by the NPC may be accurately determined, which improves the accuracy of the sound intensity of the first sound heard by the NPC, and also helps to accurately control the NPC to perform the behavioral operation corresponding to the first sound.

As an example, the obtaining a sound intensity of an environmental noise at the position of the NPC includes:

determining a target grid at which the NPC is located in a target game scene, where the target game scene is divided into a set of grids in advance, the set of grids include the target grid, each grid in the set of grids is preset with a sound intensity of a corresponding environmental noise, and the sound intensity of the environmental noise corresponding to each grid is a sound intensity determined according to a type of a virtual terrain in each grid; and determining the sound intensity of the environmental noise at the position of the NPC to be equal to the preset sound intensity of the environmental noise corresponding to the target grid.

Before the sound intensity of the environmental noise at the position of the NPC is obtained, the entire game scene needs to be divided into grids. For example, according to the actual game screen, the entire game scene is divided into 2D square grids, or into 3D cube grids. In this aspect of this disclosure, it is assumed that the entire 3D game screen is divided into a set of 0.5 m*0.5 m*0.5 m cube grids shown in FIG. 9.

Using the game scene being divided into grids, the specific implementation operations of determining the sound intensity of the environmental noise at the position of the NPC include:

S1: Set a sound intensity of an environmental noise of each grid in a target game scene.

Obviously, in a real life scene, the sound intensity of the environmental noise in a forest is greater than the sound intensity of the environmental noise in a grass, and the sound intensity of the environmental noise around a waterfall is greater than the sound intensity of the environmental noise in the forest. That is, the type of the virtual terrain in each grid directly affects the sound intensity of the environmental noise of the grid.

Therefore, in this aspect of this disclosure, a simulation system from the virtual terrain to the sound intensity of the environmental noise is established. That is, the sound intensity of the environmental noise corresponding to each grid may be determined according to the type of the virtual terrain in each grid.

Figure 10:
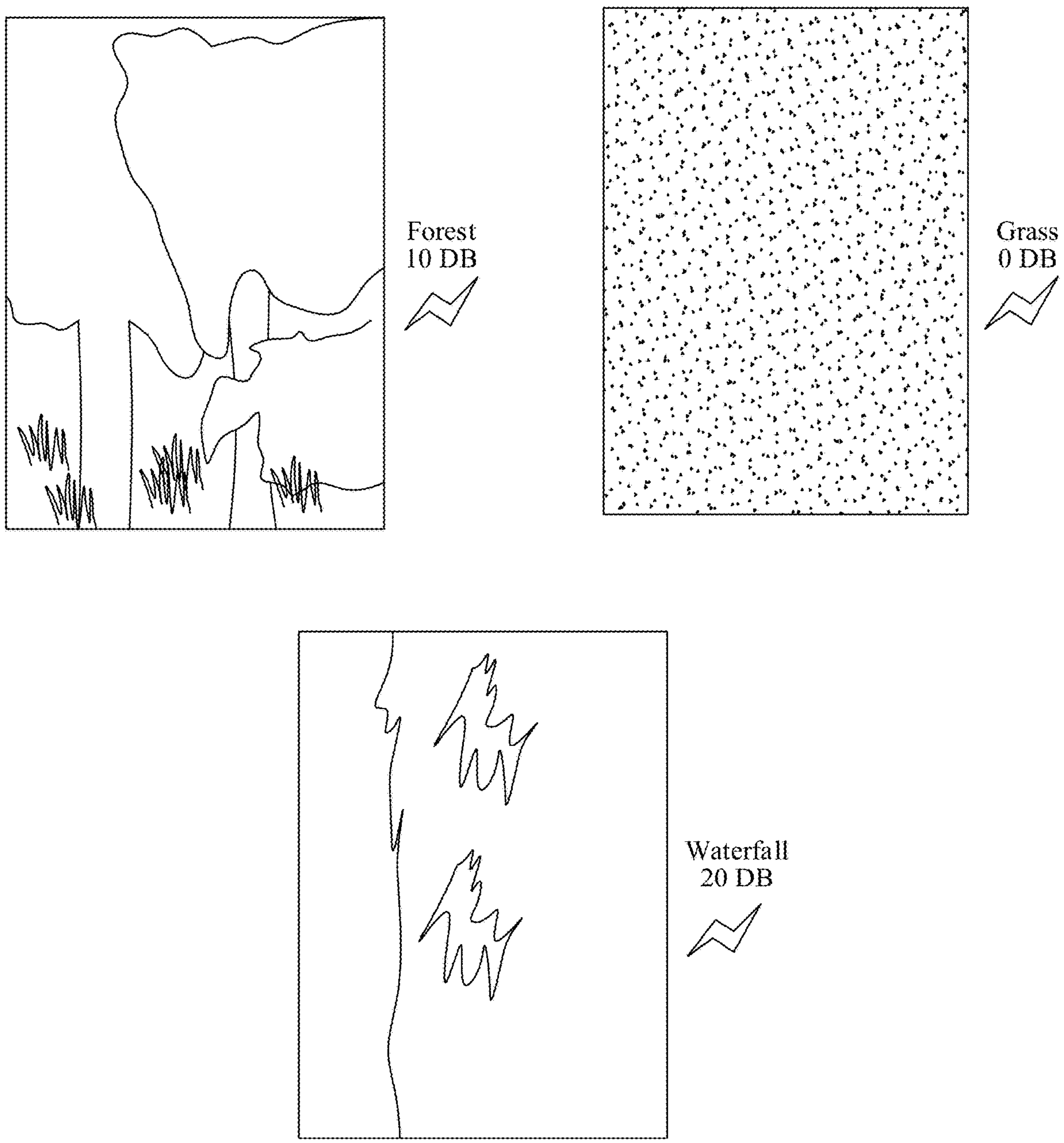
FIG. 10 is an schematic diagram of sound intensities of environmental noises corresponding to different types of virtual terrains according to an aspect of the present disclosure.

As shown in FIG. 10, when the virtual terrain at which the NPC is located is a forest, the sound intensity of the corresponding environmental noise is preset to 10 dB; when the virtual terrain at which the NPC is located is a grass, the sound intensity of the corresponding environmental noise is preset to 0 dB; and when the virtual terrain at which the NPC is located is a waterfall, the sound intensity of the corresponding environmental noise is preset to 20 dB.

In this aspect of this disclosure, by pre-calculating the sound intensity of the environmental noise of each grid in the game scene, query time for the sound intensity of the environmental noise is reduced, efficiency of determining the sound intensity of the environmental noise corresponding to each grid is improved, and data processing efficiency of the server is improved.

S2: Determine a target grid at which an NPC is located in the target game scene.

For example, when the position of the NPC is completely in one grid, the grid is directly determined as the target grid at which the NPC is located; and when the position of the NPC is in two or more grids, the grid with the largest proportion of the position of the NPC among the plurality of grids is determined as the target grid.

S3: Determine a sound intensity of an environmental noise corresponding to the preset target grid as a sound intensity of an environmental noise at a position of the NPC.

As mentioned above, noise, as a type of sound, may also propagate in the medium and also attenuates. The sound intensity of the environmental noise corresponding to each grid is not only affected by the virtual terrain of the grid, but also affected by the virtual terrain in the surrounding grids. Therefore, in this aspect of this disclosure, the simulation form of linear attenuation is also used to determine the sound intensity of the environmental noise corresponding to each grid.

As an example, in consideration of the virtual terrains in the surrounding grids, the implementation of determining the sound intensity of the environmental noise corresponding to each grid is as follows:

performing the following operations on each grid in the set of grids to obtain the sound intensity of the environmental noise corresponding to each grid, where when the following operations are performed, each grid is a current grid:

obtaining a sound intensity of an initial noise corresponding to the current grid, where the sound intensity of the initial noise has a preset correspondence with the type of the virtual terrain in the current grid;

obtaining a sound intensity of a propagated noise received by the current grid, where the sound intensity of the propagated noise includes a residual sound intensity when the initial noise corresponding to each grid in the set of grids except the current grid propagates to the current grid; and determining the sound intensity of the environmental noise corresponding to the current grid according to the sound intensity of the initial noise and the sound intensity of the propagated noise.

Figure 11:
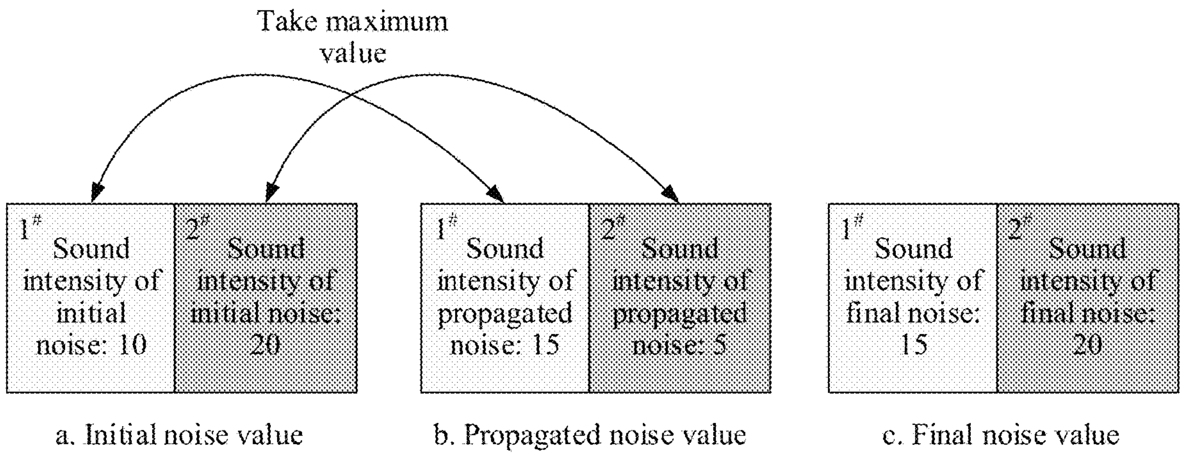
FIG. 11 is an schematic diagram of determining a sound intensity of an environmental noise at a position of an NPC according to an aspect of the present disclosure.

As shown in FIG. 11, assuming that the set of grids includes a total of two grids, and assuming that a grid 1# is the current grid, the specific operations of determining the sound intensity of the environmental noise corresponding to the current grid are as follows:

S11: First simulate a sound intensity of an initial noise corresponding to each grid according to a virtual terrain in each grid.

For example, the sound intensity of the initial noise in the grid #1 is 10, and the sound intensity of the initial noise in a grid #2 is 20.

S12: Calculate a noise impact value of the initial noise corresponding to each grid on surrounding grids in a propagation process.

The noise impact value may be, but is not limited to, the residual sound intensity when the initial noise corresponding to each grid in the set of grids except the current grid propagates to the current grid. For example, the residual sound intensity when the initial noise corresponding to the grid 1# propagates to the grid 2# is 5, and the residual sound intensity when the initial noise corresponding to the grid 2# propagates to the grid 1# is 15, which means that the sound intensity of the propagated noise received by the grid 1# from the grid 2# is 15, and the sound intensity of the propagated noise received by the grid 2# from the grid 1# is 5. In the foregoing operations, a measurement unit of the sound intensity may be but is not limited to decibel (dB).

In the process of the initial noise corresponding to the grid 1# propagating to the grid 2#, or in the process of the initial noise corresponding to the grid 2# propagating to the grid 1#, the sound intensity attenuates.

S13: Determine, according to a sound intensity of an initial noise corresponding to a grid 1# and a sound intensity of a propagated noise received by the grid 1#, a sound intensity of an environmental noise corresponding to the grid 1#.

Using the same method as the foregoing operations S11 to S13, when the grid 2# is determined as the current grid, according to the sound intensity of the initial noise corresponding to the grid 2# and the sound intensity of the propagated noise received by the grid 2#, the sound intensity of the environmental noise corresponding to the grid 2# is determined.

As an example, the determining a sound intensity of an environmental noise corresponding to the current grid according to the sound intensity of the initial noise and the sound intensity of the propagated noise includes:

determining the sound intensity of the environmental noise corresponding to the current grid to be equal to a maximum sound intensity of the sound intensity of the initial noise and the sound intensity of the propagated noise; or determining the sound intensity of the environmental noise corresponding to the current grid to be equal to a sum of the sound intensity of the initial noise and the sound intensity of the propagated noise; or determining the sound intensity of the environmental noise corresponding to the current grid to be equal to a value obtained by performing a weighted sum of the sound intensity of the initial noise and the sound intensity of the propagated noise.

The specific implementation method of the sound intensity of the environmental noise corresponding to the current grid is introduced below with specific examples.

(1) For a case in which the sound intensity of the environmental noise corresponding to the current grid is determined to be equal to a maximum sound intensity of the sound intensity of the initial noise and the sound intensity of the propagated noise As shown in FIG. 11, when the grid 1# is the current grid, assuming that the sound intensity of the initial noise of the grid 1# is 10 and the sound intensity of the propagated noise received by the grid 1# is 15, the maximum value of 10 and 15 is taken as the final sound intensity of the environmental noise of the grid 1#, that is, the sound intensity of the environmental noise corresponding to the grid 1# is 15.

When the grid 2# is the current grid, assuming that the sound intensity of the initial noise of the grid 2# is 20 and the sound intensity of the propagated noise received by the grid 2# is 5, the maximum value of 20 and 5 is taken as the final sound intensity of the environmental noise of the grid 2#, that is, the sound intensity of the environmental noise corresponding to the grid 2# is 20.

Figure 12:
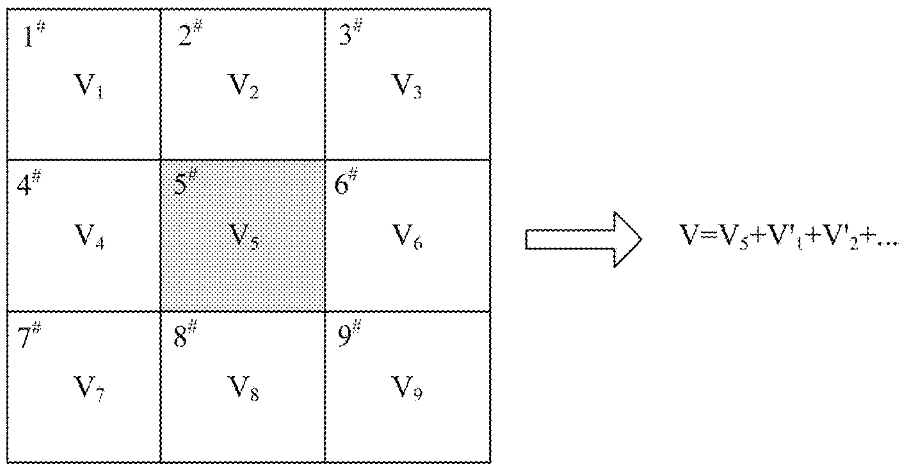
FIG. 12 is another schematic diagram of determining a sound intensity of an environmental noise at a position of an NPC according to an aspect of the present disclosure.

(2) For a case in which the sound intensity of the environmental noise corresponding to the current grid is determined to be equal to a sum of the sound intensity of the initial noise and the sound intensity of the propagated noise As shown in FIG. 12, assuming that the set of grids include a total of 9 grids, and the sound intensities of the initial noise corresponding to grids 1# to 9# are V1, V2, . . . , and V9 respectively. An example in which the current grid is the grid 5# is used for description.

Since the grid 5# is surrounded by the grids 1# to 4# and 6# to 9#, assuming that the residual sound intensity when the initial noise corresponding to the grids 1#~4# propagates to the grid 5# is V'1 to V'4 respectively and the residual sound intensity when the initial noise corresponding to the grids 6# to 9# propagates to the grid 5#, is V'6 to V'9 respectively, the sound intensity of the environmental noise corresponding to the grid 5# is $$V = V5 + V'1 \ldots V'4 + V'6 + V'9.$$

By using the foregoing linear attenuation simulation form, when the initial noise corresponding to the grids 1# to 4# and the grids 6# to 9# propagates to the grid 5#, the sound intensity of each initial noise may attenuate to 0. That is, some of the sound intensities V'1 to V'4 and V'6 to V'9 of the propagated noise received by the grid 5# may be 0.

(3) For a case in which the sound intensity of the environmental noise corresponding to the current grid is determined to be equal to a value obtained by a weighted sum of the sound intensity of the initial noise and the sound intensity of the propagated noise Still using FIG. 12 as an example, according to the type of the initial noise corresponding to the grids 1# to 4# and 6# to 9#, or the distance between the grids 1# to 4# and 6# to 9# and the grid 5#, different weights are set for the sound intensity of the propagated noise received by the grid 5#. For example, the sound intensity of the propagated noise of the surrounding grids that are close to the grid 5# has a large weight, and the sound intensity of the propagated noise of the surrounding grids that are far away from the grid 5# has a small weight.

The weighted summation is performed on the sound intensity V5 of the initial noise of the grid 5# and the sound intensities V'I to V'4 and V'6 to V'9 of the propagated noise to obtain the sound intensity of the environmental noise corresponding to the grid 5#:

$$V = W1V5 + W2V'1 \ldots W5V'4 + W6V'6 \ldots W9V'9.$$

Through the foregoing method, in consideration of the virtual terrain of the position of the NPC is ed, by introducing the sound intensity of the initial noise corresponding to the target grid at which the NPC is located and the sound intensity of the propagated noise received by the target grid, full consideration is given to the attenuation of the environmental noise and the impact of the environmental noise of the surrounding grid on the sound intensity of the environmental noise corresponding to the target grid, thereby improving the authenticity of the environmental noise.

As an example, the method further includes:

setting a preset hearing radius according to a character type of the NPC, where when the character type of the NPC is a hearing-sensitive character type, the preset hearing radius is set to a first value, and when the character type of the NPC is a hearing-insensitive character type, the preset hearing radius is set to a second value, where the first value is greater than the second value; or setting the preset hearing radius according to a current state of the NPC, where when the current state of the NPC is a state of not being harmed by an attack, the preset hearing radius is set to the first value, and when the current state of the NPC is a state of being harmed by an attack, the preset hearing radius is set to the second value, where the first value is greater than the second value; or setting the preset hearing radius according to a release state of a target skill of the NPC, where the target skill is configured for increasing a hearing range of the NPC in a state of being released (i.e., enabled), when the release state of the target skill is a released (enabled) state, the preset hearing radius is set to the first value, and when the release state of the target skill is an unreleased (i.e., not enabled) state, the preset hearing radius is set to the second value, where the first value is greater than the second value.

Based on the description of the foregoing aspects, the preset hearing radius of the NPC represents the hearing perception capability of the NPC, or may be understood as the hearing range in which the NPC can receive the sound. Therefore, in the process of determining whether the NPC can receive the first sound made by the first player character, the setting of the preset hearing radius plays a crucial role. How to set the preset hearing radius of the NPC is described below with examples.

First type: It is assumed that the NPCs are classified into two different types: hearing-sensitive and hearing-insensitive according to character types of the NPCs.

When the distances to the first player character are the same, the sound intensity of the first sound heard by the hearing-sensitive NPC is greater than the sound intensity of the first sound heard by the hearing-insensitive NPC. Alternatively, the hearing-sensitive NPC can hear the first sound made by the first player character, but the hearing-insensitive NPC cannot hear the first sound. That is, the preset hearing radius of the hearing-sensitive NPC is greater than the preset hearing radius of the hearing-insensitive NPC.

Figure 13:
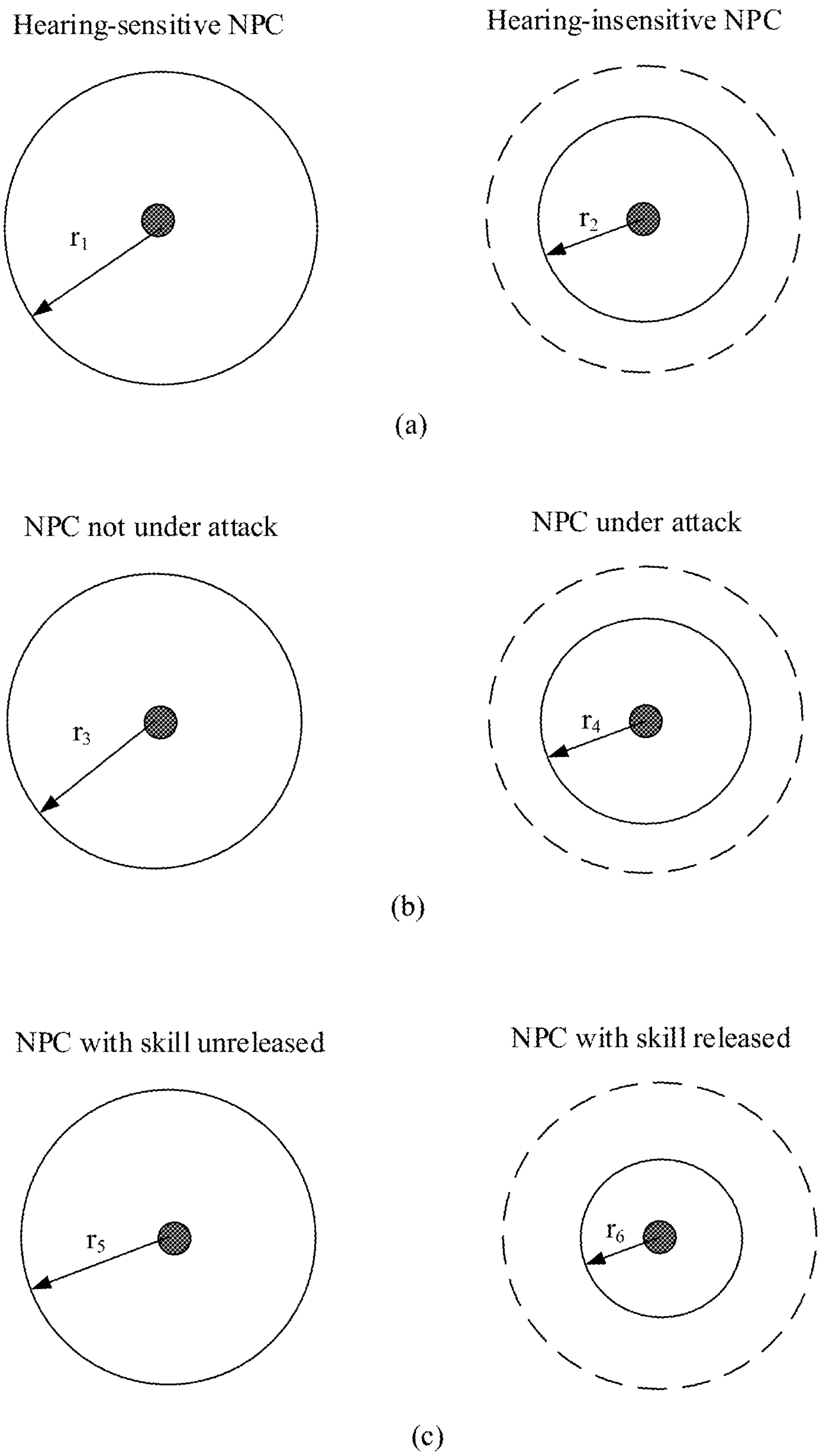
FIG. 13 is an schematic diagram of a method for setting a preset hearing radius of an NPC according to an aspect of the present disclosure.

As shown in (a) of FIG. 13, the preset hearing radius of the hearing-sensitive NPC is set to a first value r1 and the preset hearing radius of the hearing-insensitive NPC is set to a second value r2, where r1>r2.

Second type: It is assumed that the NPCs are classified into two different types: under attack and not under attack according to state features of the NPCs.

Obviously, when the distances to the first player character are the same, the sound intensity of the first sound heard by the NPC under attack is less than the sound intensity of the first sound heard by the NPC not under attack. Alternatively, the NPC not under attack can hear the first sound made by the first player character, but the NPC under attack cannot hear the first sound. That is, the preset hearing radius of the NPC not under attack is greater than the preset hearing radius of the NPC under attack.

As shown in (b) of FIG. 13, the preset hearing radius of the NPC not under attack is set to a first value r3 and the preset hearing radius of the NPC under attack is set to a second value r4, where r3>r4.

Third type: It is assumed that the NPCs are classified into two different types: skill unreleased and skill released according to skill release states of the NPCs.

When the distances to the first player character are the same, the sound intensity of the first sound heard by the NPC with skill unreleased is greater than the sound intensity of the first sound heard by the NPC with skill released. Alternatively, the NPC with skill unreleased can hear the first sound made by the first player character, but the NPC with skill released cannot hear the first sound. That is, the preset hearing radius of the NPC with skill unreleased is greater than the preset hearing radius of the NPC with skill released.

As shown in (c) of FIG. 13, the preset hearing radius of the NPC with skill unreleased is set to a first value r5 and the preset hearing radius of the NPC with skill released is set to a second value r6, where r5>r6.

Through the foregoing method, according to the character type of the NPC, the current state of the NPC, and the release state of the target skill of the NPC, the preset hearing radii of the NPC in different states under different types are set, which improves the flexibility of setting the preset hearing radius, and improving the authenticity of the preset hearing radius.

As an example, according to parameters such as the preset hearing radius of the NPC, the first sound intensity threshold, and the second sound intensity threshold, the NPC may be controlled to perform the first behavioral operation and the second behavioral operation corresponding to the first sound. In addition, through the first sound intensity threshold and the second sound intensity threshold, the behavioral operation of the NPC may further be controlled for switching, specifically, including:

obtaining a second sound intensity of a second sound and a second propagation distance of the second sound in a process of controlling the NPC to perform the behavioral operation corresponding to the first sound, where the second sound is a sound made by a second player character at a second position, the second sound intensity is a preset sound intensity corresponding to a second movement state of the second player character at the second position, and the second propagation distance is a propagation distance determined according to the second sound intensity;

determining, when a second target distance between the NPC and the second player character is less than the second propagation distance and less than the preset hearing radius of the NPC, a sound intensity of the second sound heard by the NPC according to the second sound intensity and the second target distance; and controlling the NPC to stop performing the behavioral operation corresponding to the first sound and controlling the NPC to perform a behavioral operation corresponding to the second sound when the sound intensity of the second sound heard by the NPC is greater than or equal to the first sound intensity threshold and greater than the sound intensity of the first sound heard by the NPC.

The method of obtaining the second sound intensity and the second propagation distance is similar to that of the first sound intensity and the first propagation distance. For details, refer to the foregoing description.

As shown in (a) of FIG. 14, it is assumed that the NPC is performing a behavioral operation corresponding to a sound made by a first player character P1, for example, approaching the first player character P1. A second player character P2 at a second position S2 makes a second sound. According to a sound intensity corresponding to a second movement state of the second player character P2 at the second position S2, a second sound intensity V2 corresponding to the second movement state of P2 at S2 is obtained. For the specific process, refer to the description of the first sound intensity corresponding to the first movement state of the first player character at the first position in the foregoing aspect. Details are not described again herein.

The second movement state of the second player character P2 at the second position S2 includes, but is not limited to, sneaking, sprinting, walking, and flying shown in FIG. 4.

When the second target distance between the NPC and the second player character is less than the second propagation distance and less than the preset hearing radius of the NPC, it is determined that the NPC can hear the second sound made by the second player character. In this case, the sound intensity of the second sound heard by the NPC is determined according to the second sound intensity V2 and the second target distance.

If the sound intensity of the second sound heard by the NPC is greater than or equal to the first sound intensity threshold and greater than the sound intensity of the first sound heard by the NPC, it means that the NPC is aware of the second sound, and the second sound heard by the NPC interferes with the first sound heard by the NPC in advance. Then the NPC stops approaching the first player character P1 and performs a behavioral operation corresponding to the second sound, for example, moves away from the second player character P1 shown in (b) of FIG. 14.

When the NPC hears the first sound and the second sound made by the first player character and the second player character, the sound intensities of the first sound and the second sound are calculated respectively, and when it is determined that the sound intensity of the second sound heard by the NPC is greater than the sound intensity of the first sound heard by the NPC, the behavioral operation performed by the NPC is switched, which improves the flexibility of the behavioral operation performed by the NPC, enriches the gameplay, and improves the user experience.

Figure 15:
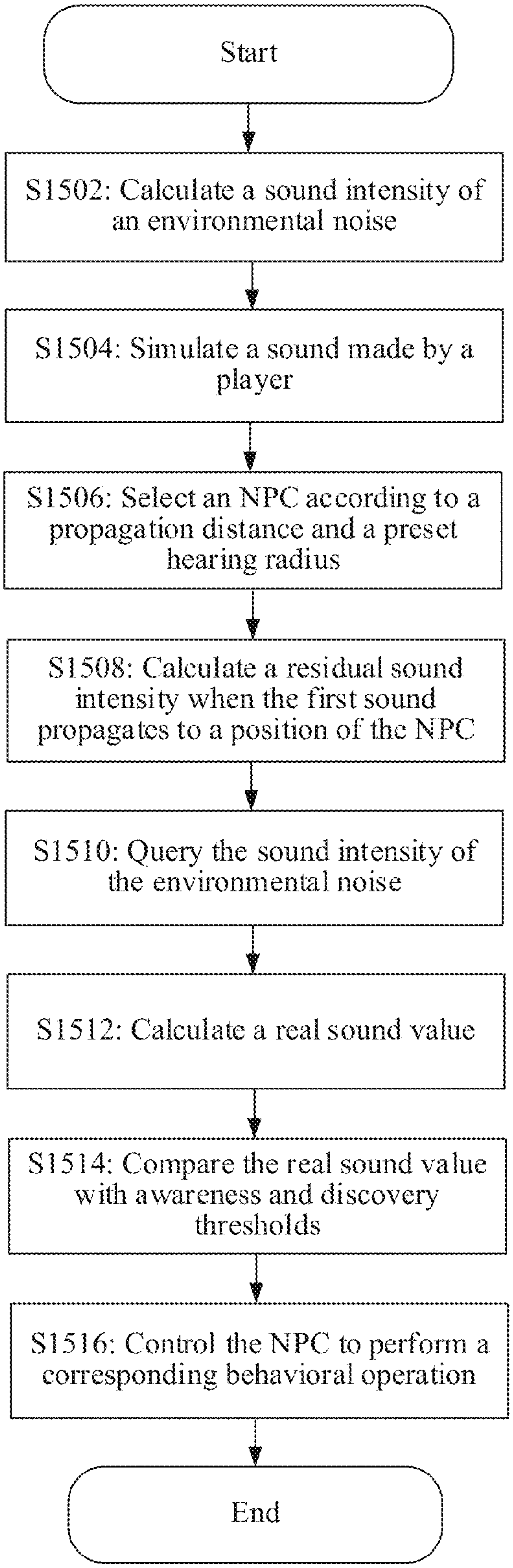
FIG. 15 is an overall flowchart of a method for controlling a non-player character according to an aspect of the present disclosure.

To more clearly understand the foregoing method for controlling a non-player character, the method is further described below with reference to the overall flowchart shown in FIG. 15. Specifically, the method includes:

S1502: Calculate a sound intensity of an environmental noise.

For example, through the schematic diagrams shown in FIG. 9 to FIG. 12, the target game scene is pre-divided into a set of grids, and a sound intensity of an environmental noise corresponding to each grid is determined according to a type of a virtual terrain in each grid in the set of grids. For determining of the sound intensity of the environmental noise of each grid, refer to the description in the foregoing aspects. Details are not described again herein.

S1504: Simulate a sound intensity of a first sound made by a player character.

Assuming that the player character makes the first sound at the first position in the game scene, the sound intensity of the first sound of the player character may be simulated according to the movement state of the player character at the first position.

The relationship between the sound intensity of the first sound and the type of the virtual terrain of the first position and/or the movement state of the player character may be determined, but is not limited to, by querying a pre-created relationship mapping table.

S1506: Select an NPC according to a propagation distance of the first sound and a preset hearing radius of the NPC.

As an example, the NPC is selected according to the propagation distance d of the first sound shown in FIG. 5 and the preset hearing radius of the NPC. The specific implementation process is as follows:

As shown in FIG. 5, assuming that a propagation distance of the first sound made by the first player character (which may also be understood as the first propagation distance of the first sound) is d, and a target distance between the first player character and an NPC 1 is d1. Since d1>d, the NPC 1 is far away from the first player character, and the NPC 1 cannot hear the first sound. A target distance between the first player character and an NPC 2 is d2. Since d2<d and d2<r, it is determined that the NPC 2 may hear the first sound, where r is a preset hearing radius of the NPC 2, and r determines a hearing range of the NPC 2.

In addition, whether the NPC 1 and the NPC 2 can hear the first sound may further be determined through the following implementation process: When the first player character makes the first sound, NPCs within the propagation distance d may first be determined according to the propagation distance d of the first sound, as shown in FIG. 5, including the NPC 1 and the NPC 2; and then, according to whether a sound source of the first sound is within the preset hearing radius of the NPC, it may be determined that only the NPC 2 can hear the first sound. Although the NPC 1 is within the propagation distance d of the first sound, the sound source of the first sound is outside the preset hearing radius of the NPC 1, and therefore the NPC 1 cannot hear the first sound.

The target distance between the NPC selected through the foregoing method and the first player character is less than the propagation distance of the first sound and less than the preset hearing radius of the NPC.

Further, by selecting the NPC through the foregoing method, subsequent calculations only need to be performed on some NPCs that meet the requirements. The subsequent calculations include but are not limited to calculation of the residual sound intensity of the first sound received by the NPC, and calculation of the sound intensity of the first sound actually heard by the NPC.

For example, assuming that a total quantity of NPCs in the virtual scene is 100, and according to the foregoing selection method, it is determined that only two NPCs meet the requirements, only the residual sound intensity of the first sound received by the two NPCs and the sound intensity of the first sound actually heard by the two NPCs need to be calculated, which reduces the amount of calculation and improves the efficiency of the NPC performing the behavioral operation.

S1508: Calculate a residual sound intensity of the first sound received by the NPC when the first sound propagates to a first position.

To ensure the authenticity of the sound source simulation, it is necessary to fully consider that when the sound propagates in a medium, the intensity of the sound continuously attenuates as the distance increases, and the attenuation of the sound is related to factors such as an attenuation formula, a distance, and a medium feature. For example, as shown in (a) of FIG. 8, the sound intensity of the first sound made from the sound source gradually attenuates to 0 as the propagation distance increases.

In this aspect of this disclosure, the specific process of sound attenuation may be simulated according to, but is not limited to, the linear attenuation formula, for example, $y=a/x$, where y is the residual sound intensity of the first sound received by the NPC, x is the first target distance between the first player character and the NPC, and a is the first sound intensity of the first sound made by the first player character at the first position.

S1510: Query the sound intensity of the environmental noise.

First, the entire game scene is divided into a set of grids, and the corresponding sound intensity of the environmental noise is preset for each grid in the set of grids. Finally, the sound intensity obtained by the NPC is determined according to the type of the virtual terrain in each grid.

As an example, the sound intensity of the environmental noise at the position of the NPC may be directly determined as the preset sound intensity of the environmental noise corresponding to the target grid, or the sound intensity of the environmental noise corresponding to the target grid is determined according to the queried initial noise corresponding to the target grid and the residual sound intensity after the initial noise made by the surrounding grids propagates to the target grid. For the specific process, refer to the description in the foregoing aspects.

S1512: Calculate a sound intensity of a first sound actually heard by the NPC.

For example, the sound intensity of the first sound heard by the NPC is determined to be equal to a difference between the residual sound intensity and the sound intensity of the environmental noise when the residual sound intensity when the first sound propagates to the position of the NPC is greater than the sound intensity of the environmental noise; or the sound intensity of the first sound heard by the NPC is determined to be equal to the sound intensity of the environmental noise or to 0 when the residual sound intensity is less than or equal to the sound intensity of the environmental noise.

S1514: Compare a relationship between the sound intensity of the first sound heard by the NPC and a hearing perception threshold and a hearing discovery threshold, and perform a corresponding behavioral operation, such as the operation S1516.

For example, when the sound intensity of the first sound heard by the NPC is greater than or equal to the hearing perception threshold (the first sound intensity threshold), the first behavioral operation in the foregoing aspect, for example, searching for the player, is performed.

When the sound intensity of the first sound heard by the NPC is greater than or equal to the hearing discovery threshold (the second sound intensity threshold), the NPC is controlled to perform the second behavioral operation, such as dialog or interaction with the player.

S1516: Control the NPC to perform a behavioral operation corresponding to the first sound.

In the aspects provided in this disclosure, when it is determined that the NPC can hear the first sound made by the first player character according to the first target distance between the non-player character (NPC) and the first player character and the preset hearing radius of the NPC, the NPC is controlled to perform the behavioral operation corresponding to the first sound by comparing the sound intensity of the first sound heard by the NPC with the first sound intensity threshold. In other words, by comparing the sound intensity of the first sound heard by the NPC and the first sound intensity threshold, the NPC can accurately perform the corresponding behavioral operation, which avoids the technical problem of being unable to accurately control the NPC to perform the behavioral operation, and improves the accuracy of controlling the NPC to perform the behavioral operation.

For ease of description, the foregoing method aspects are described as a series of action combinations. However, a person skilled in the art should know that the present disclosure is not limited to the described order of the actions because some operations may be performed in another order or performed at the same time according to the present disclosure. In addition, a person skilled in the art is also to learn that the aspects described in this specification are all exemplary aspects, and the involved actions and modules are not necessarily required to the present disclosure.

Figure 16:
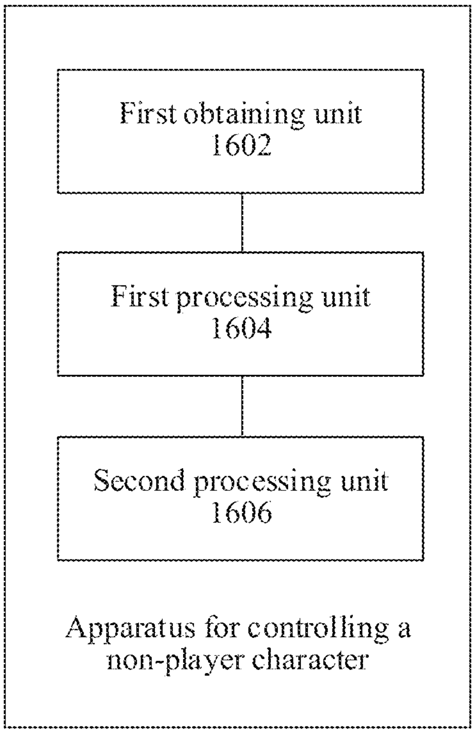
FIG. 16 is an schematic structural diagram of an apparatus for controlling a non-player character according to an aspect of the present disclosure.

According to another aspect of the aspects of the present disclosure, an apparatus for controlling a non-player character shown in FIG. 16 is further provided. The apparatus includes:

a first obtaining unit 1602, configured to obtain a first sound intensity of a first sound and a first propagation distance of the first sound, the first sound being a sound made by a first player character at a first position, the first sound intensity being a preset sound intensity corresponding to a first movement state of the first player character at the first position, and the first propagation distance being a propagation distance determined according to the first sound intensity;

a first processing unit 1604, configured to determine, when a first target distance between a non-player character (NPC) and the first player character is less than the first propagation distance and less than a preset hearing radius of the NPC, a sound intensity of the first sound heard by the NPC according to the first sound intensity and the first target distance; and a second processing unit 1606, configured to control the NPC to perform a behavioral operation corresponding to the first sound when the sound intensity of the first sound heard by the NPC is greater than or equal to a first sound intensity threshold.

In some aspects, the second processing unit 1606 includes:

a first processing module, configured to control the NPC to perform a first behavioral operation when the sound intensity of the first sound heard by the NPC is greater than or equal to the first sound intensity threshold and less than a second sound intensity threshold, where the first behavioral operation is a behavioral operation performed when the NPC is aware of a sound.

In some aspects, the first processing module further includes:

a first processing sub-module, configured to control the NPC to perform a second behavioral operation when the sound intensity of the first sound heard by the NPC is greater than or equal to the second sound intensity threshold, where the second behavioral operation is a behavioral operation performed when the NPC discovers the first player character.

In some aspects, the second processing unit 1606 includes:

a second processing module, configured to control the NPC to move to the first position when the sound intensity of the first sound heard by the NPC is greater than or equal to the first sound intensity threshold and less than the second sound intensity threshold; or control the NPC to search for the first player character while moving to the first position when the sound intensity of the first sound heard by the NPC is greater than or equal to the first sound intensity threshold and less than the second sound intensity threshold.

In some aspects, the second processing module further includes:

a second processing sub-module, configured to control the NPC to move in a direction away from the first player character or controlling the NPC to move in a direction of the first player character when the sound intensity of the first sound heard by the NPC is greater than or equal to the second sound intensity threshold; or control the NPC to perform an interactive operation with the first player character when the sound intensity of the first sound heard by the NPC is greater than or equal to the second sound intensity threshold.

In some aspects, the first processing unit 1604 includes:

a third processing module, configured to determine a residual sound intensity when the first sound propagates to a position of the NPC according to the first sound intensity and the first target distance;

a first obtaining module, configured to obtain a sound intensity of an environmental noise at the position of the NPC; and a fourth processing module, configured to determine the sound intensity of the first sound heard by the NPC according to the residual sound intensity and the sound intensity of the environmental noise.

In some aspects, the first obtaining module includes:

a third processing sub-module, configured to determine a target grid at which the NPC is located in a target game scene, where the target game scene is divided into a set of grids in advance, the set of grids include the target grid, each grid in the set of grids is preset with a sound intensity of a corresponding environmental noise, and the sound intensity of the environmental noise corresponding to each grid is a sound intensity determined according to a type of a virtual terrain in each grid; and a fourth processing sub-module, configured to determine the sound intensity of the environmental noise at the position of the NPC to be equal to the preset sound intensity of the environmental noise corresponding to the target grid.

In some aspects, the first obtaining module further includes:

a fifth processing sub-module, configured to perform the following operations on each grid in the set of grids to obtain the sound intensity of the environmental noise corresponding to each grid, where when the following operations are performed, each grid is a current grid:

obtain a sound intensity of an initial noise corresponding to the current grid, where the sound intensity of the initial noise has a preset correspondence with the type of the virtual terrain in the current grid;

obtain a sound intensity of a propagated noise received by the current grid, where the sound intensity of the propagated noise includes a residual sound intensity when the initial noise corresponding to each grid in the set of grids except the current grid propagates to the current grid; and determine the sound intensity of the environmental noise corresponding to the current grid according to the sound intensity of the initial noise and the sound intensity of the propagated noise.

In some aspects, the apparatus further includes:

a sixth processing sub-module, configured to determine the sound intensity of the environmental noise corresponding to the current grid to be equal to a maximum sound intensity of the sound intensity of the initial noise and the sound intensity of the propagated noise; or determine the sound intensity of the environmental noise corresponding to the current grid to be equal to a sum of the sound intensity of the initial noise and the sound intensity of the propagated noise; or determine the sound intensity of the environmental noise corresponding to the current grid to be equal to a value obtained by performing a weighted sum of the sound intensity of the initial noise and the sound intensity of the propagated noise.

In some aspects, the fourth processing module includes:

a seventh processing sub-module, configured to determine the sound intensity of the first sound heard by the NPC to be equal to a difference between the residual sound intensity and the sound intensity of the environmental noise when the residual sound intensity is greater than the sound intensity of the environmental noise; and/or determine the sound intensity of the first sound heard by the NPC to be equal to the sound intensity of the environmental noise or to 0 when the residual sound intensity is less than or equal to the sound intensity of the environmental noise.

In some aspects, the apparatus further includes:

a third processing unit, configured to set a preset hearing radius according to a character type of the NPC, where when the character type of the NPC is a hearing-sensitive character type, the preset hearing radius is set to a first value, and when the character type of the NPC is a hearing-insensitive character type, the preset hearing radius is set to a second value, where the first value is greater than the second value; or set the preset hearing radius according to a current state of the NPC, where when the current state of the NPC is a state of not being harmed by an attack, the preset hearing radius is set to the first value, and when the current state of the NPC is a state of being harmed by an attack, the preset hearing radius is set to the second value, where the first value is greater than the second value; or set the preset hearing radius according to a release state of a target skill of the NPC, where the target skill is configured for increasing a hearing range of the NPC in a state of being released, when the release state of the target skill is a released state, the preset hearing radius is set to the first value, and when the release state of the target skill is an unreleased state, the preset hearing radius is set to the second value, where the first value is greater than the second value.

In some aspects, the apparatus further includes:

a second obtaining unit, configured to obtain a second sound intensity of a second sound and a second propagation distance of the second sound in a process of controlling the NPC to perform the behavioral operation corresponding to the first sound, where the second sound is a sound made by a second player character at a second position, the second sound intensity is a preset sound intensity corresponding to a second movement state of the second player character at the second position, and the second propagation distance is a propagation distance determined according to the second sound intensity;

a fourth processing unit, configured to determine, when a second target distance between the NPC and the second player character is less than the second propagation distance and less than the preset hearing radius of the NPC, a sound intensity of the second sound heard by the NPC according to the second sound intensity and the second target distance; and a fifth processing unit, configured to control the NPC to stop performing the behavioral operation corresponding to the first sound and controlling the NPC to perform a behavioral operation corresponding to the second sound when the sound intensity of the second sound heard by the NPC is greater than or equal to the first sound intensity threshold and greater than the sound intensity of the first sound heard by the NPC.

By applying the apparatus, when it is determined that the NPC can hear the first sound made by the first player character according to the first target distance between the non-player character (NPC) and the first player character and the preset hearing radius of the NPC, the NPC is controlled to perform the behavioral operation corresponding to the first sound by comparing the sound intensity of the first sound heard by the NPC with the first sound intensity threshold. In other words, by comparing the sound intensity of the first sound heard by the NPC and the first sound intensity threshold, the NPC can accurately perform the corresponding behavioral operation, which avoids the technical problem of being unable to accurately control the NPC to perform the behavioral operation, and improves the accuracy of controlling the NPC to perform the behavioral operation.

For the aspect of the apparatus for controlling a non-player character herein, reference may be made to the foregoing aspect of the method for controlling a non-player character. Details are not described again herein.

Figure 17:
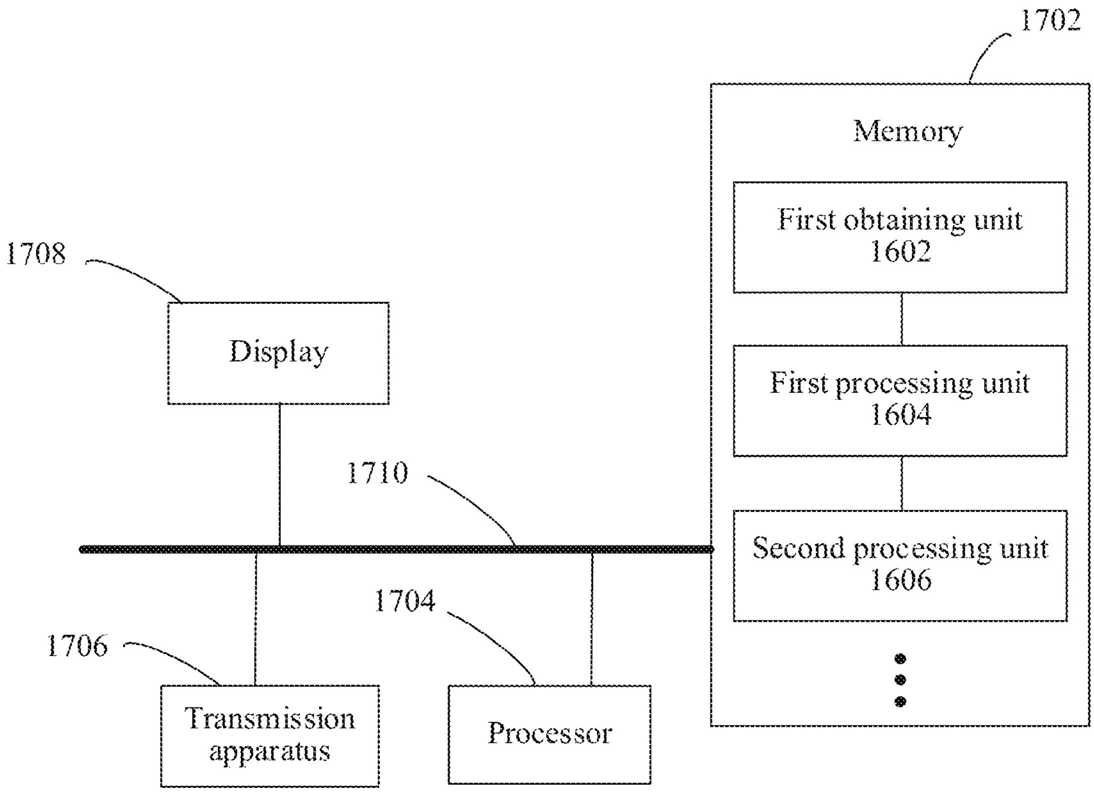
FIG. 17 is an schematic structural diagram of an electronic device according to an aspect of the present disclosure.

According to still another aspect of the aspects of this disclosure, an electronic device for performing the foregoing method for controlling a non-player character is further provided. The electronic device may be a terminal device shown in FIG. 17. In this aspect, the electronic device being a background device is used as an example for description. As shown in FIG. 17, the electronic device includes a memory 1702 (e.g., a non-transitory computer-readable storage medium) and a processor 1704 (i.e., processing circuitry). The memory 1702 stores a computer program. The processor 1704 is configured to perform the operations in any one of the foregoing method aspects by executing the computer program.

In some aspects, in this aspect, the electronic device may be located in at least one of a plurality of network devices in a computer network.

In some aspects, in this aspect, the processor may be configured to perform the following operations by executing the computer program.

S1: Obtain a first sound intensity of a first sound and a first propagation distance of the first sound, the first sound being a sound made by a first player character at a first position, the first sound intensity being a preset sound intensity corresponding to a first movement state of the first player character at the first position, and the first propagation distance being a propagation distance determined according to the first sound intensity.

S2: Determine, when a first target distance between a non-player character (NPC) and the first player character is less than the first propagation distance and less than a preset hearing radius of the NPC, a sound intensity of the first sound heard by the NPC according to the first sound intensity and the first target distance.

S3: Control the NPC to perform a behavioral operation corresponding to the first sound when the sound intensity of the first sound heard by the NPC is greater than or equal to a first sound intensity threshold.

In some aspects, a person of ordinary skill in the art may understand that, the structure shown in FIG. 17 is only schematic. Alternatively, the electronic apparatus and the electronic device may be a target terminal such as a smartphone (for example, an Android mobile phone or an iOS mobile phone), a tablet computer, a palmtop computer, a mobile Internet device (MID), or a PAD. FIG. 17 does not limit the structure of the foregoing electronic apparatus and electronic device. For example, the electronic device may further include more or fewer components (such as a network interface) than those shown in FIG. 17, or have a configuration different from that shown in FIG. 17.

The memory 1702 may be configured to store a software program and a module, for example, a program instruction/module corresponding to the method and apparatus for controlling a non-player character in the aspects of this disclosure, and the processor 1704 performs various functional applications and data processing by running a software program and a module stored in the memory 1702, that is, implementing the foregoing method for controlling a non-player character. The memory 1702 may include a high-speed RAM, and may further include a non-volatile memory such as one or more magnetic storage apparatuses, a flash memory, or another non-volatile solid-state memory. In some aspects, the memory 1702 may further include memories remotely disposed relative to the processor 1704, and these remote memories may be connected to the terminal through a network. The foregoing examples of the network include, but are not limited to, the Internet, an intranet, a local area network, a mobile communication network, and a combination thereof. The memory 1702 may specifically, but is not limited to, be configured to store the first sound intensity of the first sound, the first target distance between the NPC and the first player character, the preset hearing radius of the NPC, and the like. As an example, as shown in FIG. 17, the memory 1702 may include, but is not limited to, the first obtaining unit 1602, the first processing unit 1604, and the second processing unit 1606 in the foregoing apparatus for controlling a non-player character. In addition, the memory 1702 may further include, but is not limited to, other module units in the apparatus for controlling a non-player character, which are not described in this example.

In some aspects, the transmission apparatus 1706 is configured to receive or transmit data through a network. Specific examples of the network include a wired network and a wireless network. In an example, the transmission apparatus 1706 includes an NIC. The NIC may be connected to another network device and a router by using a network cable, to communicate with the Internet or a local area network. In an example, the transmission apparatus 1706 is a radio frequency (RF) module, and is configured to wirelessly communicate with the Internet.

In addition, the foregoing electronic device may further include: a display 1708, configured to display direction prompt information of the target sound; and a connection bus 1710, configured to connect various module components in the electronic device.

In other aspects, the foregoing target terminal or server may be a node in a distributed system. The distributed system may be a blockchain system. The blockchain system may be a distributed system formed by the plurality of nodes connected in the form of network communication. A peer to peer (P2P) network may be formed between the nodes. A computing device in any form, for example, an electronic device such as a server or a terminal, may become a node in the blockchain system by joining the P2P network.

According to an aspect of this disclosure, a computer program product or a computer program is provided, the computer program product or the computer program including computer instructions, the computer instructions being stored in a computer-readable storage medium. A processor of a computer device reads the computer instructions from the computer-readable storage medium, and the processor executes the computer instructions, causing the computer device to perform the method for controlling a non-player character provided in various implementations of the foregoing server verification processing and other aspects, where the computer program is configured to perform the operations of any one of the foregoing method aspects when running.

In some aspects, in this aspect, the computer-readable storage medium may be configured to store a computer program configured to perform the following operations:

S1: Obtain a first sound intensity of a first sound and a first propagation distance of the first sound, the first sound being a sound made by a first player character at a first position, the first sound intensity being a preset sound intensity corresponding to a first movement state of the first player character at the first position, and the first propagation distance being a propagation distance determined according to the first sound intensity.

S2: Determine, when a first target distance between a non-player character (NPC) and the first player character is less than the first propagation distance and less than a preset hearing radius of the NPC, a sound intensity of the first sound heard by the NPC according to the first sound intensity and the first target distance.

S3: Control the NPC to perform a behavioral operation corresponding to the first sound when the sound intensity of the first sound heard by the NPC is greater than or equal to a first sound intensity threshold.

In some aspects, in this aspect, a person of ordinary skill in the art may understand that all or some of the operations of the various methods in the foregoing aspects may be implemented by a program instructing hardware related to the target terminal. The program may be stored in a computer-readable storage medium. The storage medium may include: a flash drive, a read-only memory (ROM), a random access memory (RAM), a magnetic disk, an optical disc, or the like.

The sequence numbers of the foregoing aspects of this disclosure are merely for description purpose, and do not indicate the preference among the aspects.

When the integrated unit in the foregoing aspects is implemented in the form of a software function unit and sold or used as an independent product, the integrated unit may be stored in the foregoing computer-readable storage medium. Based on such an understanding, the technical solutions of the present disclosure essentially, or a part contributing to the related art, or all or a part of the technical solution may be implemented in a form of a software product. The computer software product is stored in a storage medium and includes several instructions for instructing one or more computer devices (which may be a PC, a server, a network device, or the like) to perform all or some of operations of the methods in the aspects of the present disclosure.

In the foregoing aspects of the present disclosure, the descriptions of the aspects have respective focuses. For a part that is not described in detail in an aspect, reference may be made to related descriptions in other aspects.

In the several aspects provided in this disclosure, it is to be understood that the disclosed client may be implemented in other manners. The described apparatus aspects are merely exemplary. For example, the unit division is merely logical function division, and may use other division manners during actual implementation. For example, a plurality of units or components may be combined or integrated into another system, or some features may be omitted or not performed. In addition, the displayed or discussed mutual couplings or direct couplings or communication connections may be implemented through some interfaces. The indirect couplings or communication connections between the units or modules may be implemented in electronic or another form.

The units described as separate parts may or may not be physically separate, and components displayed as units may or may not be physical units, that is, may be located in one position, or may be distributed on a plurality of network units. Some or all of the units may be selected based on actual requirements to achieve the objectives of the solutions of aspects.

In addition, the functional units in the aspects of the present disclosure may be integrated into one processing unit, or each of the units may exist alone physically, or two or more units are integrated into one unit. The integrated unit may be implemented in a form of hardware, or may be implemented in a form of a software functional unit.

The foregoing disclosure includes some exemplary embodiments of this disclosure which are not intended to limit the scope of this disclosure. Other embodiments shall also fall within the scope of this disclosure.

What is claimed is:

1. A method for controlling a non-player character, comprising:

obtaining a first sound level of a first sound and a first propagation distance of the first sound, the first sound being a sound made by a first player character at a first position in a virtual scene, the first sound level corresponding to a first movement of the first player character at the first position, and the first propagation distance being a propagation distance determined according to the first sound level;

based on the first sound being made by the first player character, determining, by processing circuitry, a set of non-player characters (NPCs) within the first propagation distance to the first player character in the virtual scene;

selecting, by the processing circuitry, an NPC in the virtual scene from the set of NPCs based on a distance between the NPC and the first player character being less than a preset hearing radius of the NPC; and when the NPC is selected based on the distance between the NPC and the first player character being less than the preset hearing radius of the NPC, determining, by the processing circuitry, a sound level of the first sound heard by the NPC in the virtual scene according to the first sound level and the distance between the NPC and the first player character; and controlling, by the processing circuitry, the NPC to perform a behavioral operation corresponding to the first sound when the sound level of the first sound heard by the NPC is greater than or equal to a first sound level threshold.

2. The method according to claim 1, wherein the controlling comprises:

controlling the NPC to perform a first behavioral operation when the sound level of the first sound heard by the NPC is greater than or equal to the first sound level threshold and less than a second sound level threshold, wherein the first behavioral operation is a behavioral operation performed when the NPC is aware of a sound.

3. The method according to claim 2, wherein the controlling the NPC to perform the behavioral operation corresponding to the first sound further comprises:

controlling the NPC to perform a second behavioral operation when the sound level of the first sound heard by the NPC is greater than or equal to the second sound level threshold, wherein the second behavioral operation is a behavioral operation performed when the NPC discovers the first player character.

4. The method according to claim 1, wherein the controlling comprises:

controlling the NPC to move to the first position when the sound level of the first sound heard by the NPC is greater than or equal to the first sound level threshold and less than a second sound level threshold; or controlling the NPC to search for the first player character while moving to the first position when the sound level of the first sound heard by the NPC is greater than or equal to the first sound level threshold and less than the second sound level threshold.

5. The method according to claim 4, wherein the controlling the NPC to perform the behavioral operation corresponding to the first sound further comprises:

controlling the NPC to move in a direction away from the first player character or controlling the NPC to move in a direction of the first player character when the sound level of the first sound heard by the NPC is greater than or equal to the second sound level threshold; or controlling the NPC to perform an interactive operation with the first player character when the sound level of the first sound heard by the NPC is greater than or equal to the second sound level threshold.

6. The method according to claim 1, wherein the determining the sound level of the first sound heard by the NPC comprises:

determining a residual sound level when the first sound propagates to a position of the NPC according to the first sound level and the distance between the NPC and the first player character;

obtaining a sound level of an environmental noise at the position of the NPC; and determining the sound level of the first sound heard by the NPC according to the residual sound level and the sound level of the environmental noise.

7. The method according to claim 6, wherein the obtaining comprises:

determining a grid at which the NPC is located in the virtual scene, wherein the virtual scene is divided into plural grids in advance, each of the plural grids is preset with a corresponding sound level of environmental noise, and the sound level of the environmental noise corresponding to each grid is a sound level determined according to a type of a virtual terrain in each grid; and determining the sound level of the environmental noise at the position of the NPC to be equal to the preset sound level of the environmental noise corresponding to the grid at which the NPC is located in the virtual scene.

8. The method according to claim 7, wherein the method further comprises:

to obtain the sound level of the environmental noise corresponding to each respective grid of the plural grids:

obtaining a sound level of an initial noise corresponding to the respective grid, wherein the sound level of the initial noise has a preset correspondence with the type of the virtual terrain in the respective grid;

obtaining a sound level of a propagated noise received by the respective grid, wherein the sound level of the propagated noise comprises a residual sound level representing the initial noise corresponding to each grid in the plural grids except the respective grid propagating to the respective grid; and determining the sound level of the environmental noise corresponding to the respective grid according to the sound level of the initial noise and the sound level of the propagated noise.

9. The method according to claim 8, wherein the determining the sound level of the environmental noise corresponding to the respective grid according to the sound level of the initial noise and the sound level of the propagated noise comprises:

determining the sound level of the environmental noise corresponding to the respective grid to be equal to a maximum sound level of the sound level of the initial noise and the sound level of the propagated noise; or determining the sound level of the environmental noise corresponding to the respective grid to be equal to a sum of the sound level of the initial noise and the sound level of the propagated noise; or determining the sound level of the environmental noise corresponding to the respective grid to be equal to a value obtained by performing a weighted sum of the sound level of the initial noise and the sound level of the propagated noise.

10. The method according to claim 6, wherein the determining the sound level of the first sound heard by the NPC according to the residual sound level and the sound level of the environmental noise comprises:

determining the sound level of the first sound heard by the NPC to be equal to a difference between the residual sound level and the sound level of the environmental noise when the residual sound level is greater than the sound level of the environmental noise; or determining the sound level of the first sound heard by the NPC to be equal to the sound level of the environmental noise or to 0 when the residual sound level is less than or equal to the sound level of the environmental noise.

11. The method according to claim 1, wherein the method further comprises:

setting a preset hearing radius according to a character type of the NPC, wherein when the character type of the NPC is a hearing-sensitive character type, the preset hearing radius is set to a first value, and when the character type of the NPC is a hearing-insensitive character type, the preset hearing radius is set to a second value, wherein the first value is greater than the second value; or setting the preset hearing radius according to a current state of the NPC, wherein when the current state of the NPC is a state of not being harmed by an attack, the preset hearing radius is set to a third value, and when the current state of the NPC is a state of being harmed by an attack, the preset hearing radius is set to a fourth value, wherein the third value is greater than the fourth value; or setting the preset hearing radius according to a state of a skill of the NPC, wherein the skill is configured for increasing a hearing range of the NPC, when the skill is enabled, the preset hearing radius is set to a fifth value, and when the skill is not enabled, the preset hearing radius is set to a sixth value, wherein the fifth value is greater than the sixth value.

12. The method according to claim 1, wherein the method further comprises:

obtaining a second sound level of a second sound and a second propagation distance of the second sound in a process of controlling the NPC to perform the behavioral operation corresponding to the first sound, wherein the second sound is a sound made by a second player character at a second position in the virtual scene, the second sound level corresponding to a second movement of the second player character at the second position, and the second propagation distance is a propagation distance determined according to the second sound level;

when a second distance between the NPC and the second player character is less than the second propagation distance and less than the preset hearing radius of the NPC, determining a sound level of the second sound heard by the NPC in the virtual scene according to the second sound level and the second distance between the NPC and the second player character; and controlling the NPC to stop performing the behavioral operation corresponding to the first sound and controlling the NPC to perform a behavioral operation corresponding to the second sound when the sound level of the second sound heard by the NPC is greater than or equal to the first sound level threshold and greater than the sound level of the first sound heard by the NPC.

13. An apparatus for controlling a non-player character, comprising:

processing circuitry configured to:

obtain a first sound level of a first sound and a first propagation distance of the first sound, the first sound being a sound made by a first player character at a first position in a virtual scene, the first sound level corresponding to a first movement of the first player character at the first position, and the first propagation distance being a propagation distance determined according to the first sound level;

based on the first sound being made by the first player character, determine a set of non-player characters (NPCs) within the first propagation distance to the first player character in the virtual scene;

select an NPC in the virtual scene from the set of NPCs based on a distance between the NPC and the first player character being less than a preset hearing radius of the NPC; and when the NPC is selected based on the distance between the NPC and the first player character being less than the preset hearing radius of the NPC, determine a sound level of the first sound heard by the NPC in the virtual scene according to the first sound level and the distance between the NPC and the first player character; and control the NPC to perform a behavioral operation corresponding to the first sound when the sound level of the first sound heard by the NPC is greater than or equal to a first sound level threshold.

14. The apparatus according to claim 13, wherein the processing circuitry is further configured to:

control the NPC to perform a first behavioral operation when the sound level of the first sound heard by the NPC is greater than or equal to the first sound level threshold and less than a second sound level threshold, wherein the first behavioral operation is a behavioral operation performed when the NPC is aware of a sound.

15. The apparatus according to claim 14, wherein the processing circuitry is further configured to:

control the NPC to perform a second behavioral operation when the sound level of the first sound heard by the NPC is greater than or equal to the second sound level threshold, wherein the second behavioral operation is a behavioral operation performed when the NPC discovers the first player character.

16. The apparatus according to claim 13, wherein the processing circuitry is further configured to:

control the NPC to move to the first position when the sound level of the first sound heard by the NPC is greater than or equal to the first sound level threshold and less than a second sound level threshold; or control the NPC to search for the first player character while moving to the first position when the sound level of the first sound heard by the NPC is greater than or equal to the first sound level threshold and less than the second sound level threshold.

17. The apparatus according to claim 16, wherein the processing circuitry is further configured to:

control the NPC to move in a direction away from the first player character or control the NPC to move in a direction of the first player character when the sound level of the first sound heard by the NPC is greater than or equal to the second sound level threshold; or control the NPC to perform an interactive operation with the first player character when the sound level of the first sound heard by the NPC is greater than or equal to the second sound level threshold.

18. The apparatus according to claim 13, wherein the processing circuitry is further configured to:

determine a residual sound level when the first sound propagates to a position of the NPC according to the first sound level and the distance between the NPC and the first player character;

obtain a sound level of an environmental noise at the position of the NPC; and determine the sound level of the first sound heard by the NPC according to the residual sound level and the sound level of the environmental noise.

19. The apparatus according to claim 18, wherein the processing circuitry is further configured to:

determine a grid at which the NPC is located in the virtual scene, wherein the virtual scene is divided into plural grids in advance, each of the plural grids is preset with a corresponding sound level of environmental noise, and the sound level of the environmental noise corresponding to each grid is a sound level determined according to a type of a virtual terrain in each grid; and determine the sound level of the environmental noise at the position of the NPC to be equal to the preset sound level of the environmental noise corresponding to the grid at which the NPC is located in the virtual scene.

20. A non-transitory computer-readable storage medium storing computer-readable instructions, which, when executed by processing circuitry of an information processing apparatus, cause the information processing apparatus to perform a method for controlling a non-player character, the method comprising:

obtaining a first sound level of a first sound and a first propagation distance of the first sound, the first sound being a sound made by a first player character at a first position in a virtual scene, the first sound level corresponding to a first movement of the first player character at the first position, and the first propagation distance being a propagation distance determined according to the first sound level;

based on the first sound being made by the first player character, determining, by processing circuitry, a set of non-player characters (NPCs) within the first propagation distance to the first player character in the virtual scene;

selecting, by the processing circuitry, an NPC in the virtual scene from the set of NPCs based on a distance between the NPC and the first player character being less than a preset hearing radius of the NPC; and when the NPC is selected based on the distance between the NPC and the first player character being less than the preset hearing radius of the NPC, determining a sound level of the first sound heard by the NPC in the virtual scene according to the first sound level and the distance between the NPC and the first player character; and controlling the NPC to perform a behavioral operation corresponding to the first sound when the sound level of the first sound heard by the NPC is greater than or equal to a first sound level threshold.

* * * * *